United States Patent [19]
Ito

[11] Patent Number: 5,574,658
[45] Date of Patent: Nov. 12, 1996

[54] METHOD OF DESIGNING OPTIMUM SKELETON AND PLATE STRUCTURES

[75] Inventor: Nobutaka Ito, Kawasaki, Japan

[73] Assignee: Fujitsu Limited, Kawasaki, Japan

[21] Appl. No.: 236,127

[22] Filed: May 2, 1994

[30] Foreign Application Priority Data

Jun. 25, 1993 [JP] Japan ................................ 5-154007

[51] Int. Cl.$^6$ ............................................... G06T 17/20
[52] U.S. Cl. .......................... 364/512; 364/505; 14/77.1
[58] Field of Search ............................. 364/512, 578, 364/505; 382/113, 199, 270; 14/77.1; 395/124

[56] References Cited

U.S. PATENT DOCUMENTS

| | | | |
|---|---|---|---|
| 4,742,473 | 5/1988 | Shugar et al. | 364/518 |
| 4,914,589 | 4/1990 | Crawford | 395/124 |
| 5,046,115 | 9/1991 | Maruyama et al. | 382/199 |
| 5,202,843 | 4/1993 | Kunimine et al. | 364/578 |
| 5,377,119 | 12/1994 | Backer et al. | 364/578 |
| 5,379,350 | 1/1995 | Shimazu et al. | 382/199 |
| 5,402,366 | 3/1995 | Kihara et al. | 364/578 |
| 5,440,674 | 8/1995 | Park | 395/123 |

FOREIGN PATENT DOCUMENTS 437116 2/1992 Japan ............................ 364/578

OTHER PUBLICATIONS

Canales, J. et al, Adaptive Mesh Refinement Procedure for Shape Optimal Design, Advances in Engineering Software, pp. 131–145 Jan. 1993.
Hauden, C., Analysis for mechanical Design, Computer–Aided Engineering, v10, n3, pp. 50–53 Mar. 1991.
Tadepalli, R C et al, Design Approach for Perform Prediction, Advances in Powder Metallurgy & Particulate Materials, v2, pp. 59–67 Jan. 1992.
Bendsoe, M P et al, Integrated Topology and Boundary Shape Optimization of 2–D Solids, Computer Methods in Applied Mechanics and Engineering, v87, pp. 15–34 May 1991.
"Introduction to Algorithms", Carmen et al., 1991, pp. 768–771.
Suzuki et al., "A Homogenization Method for Shape and Topology Optimization," *Computer Methods in Applied Mechanics and Engineering*, vol. 93, No. 3, Dec. 1991, pp. 291–318.

*Primary Examiner*—Kevin J. Teska
*Assistant Examiner*—Matthew Loppnow
*Attorney, Agent, or Firm*—Staas & Halsey

[57] ABSTRACT

A method of designing an optimum skeleton structure uses a computer to obtain a skeleton structure from a density distribution within a 2 or 3 dimensional design region which is obtained as an optimum shape of a mechanical structure, where the design region is divided into finite elements each having a density D assigned thereto. The method includes the steps of (a) inputting a first reference value $D_S$ of the density D, (b) regarding a point within the design region where an external force is applied as one of starting point candidates, (c) selecting a starting point which is non-selected from the starting point candidates, (d) extending a line from the starting point and passing through the finite element satisfying $D \geq D_S$ so that the line is as straight as possible, and (e) stopping the extension of the line and regarding the line as a skeleton member when no adjacent finite element satisfying $D \geq D_S$ exists or when a non-selected starting point candidate is reached. The steps (c) through (e) are repeated until no more non-selected starting point candidate exists.

9 Claims, 29 Drawing Sheets

STEP 50

DENSITY
- 1.000
- 0.808
- 0.728
- 0.648
- 0.568
- 0.489
- 0.409
- 0.329
- 0.249
- 0.170
- 0.090
- 0.000

FIG. 7A  STEP 42

|   | G | F | E | D | C | B | A |   |
|---|---|---|---|---|---|---|---|---|
| 1 |   |   |   |   |   |   |   |   |
| 2 |   | 7 | 7 | 6 | 3 |   |   |   |
| 3 |   |   | 2 | 5 | 4 | 5 |   |   |
| 4 |   | 1 | 4 |   | 2 | 2 | 6 |   |
| 5 |   | 7 |   |   |   | 1 | 1 | 10 |

P$_W$ ... P$_{F1}$ (with c—b and d—a markings between columns C and B at rows 2-3 and 3-4)

FIG. 7B  STEP 43

|   | G | F | E | D | C | B | A |
|---|---|---|---|---|---|---|---|
| 1 |   |   |   |   |   |   |   |
| 2 |   | 7 | 7 | 6 | 3 |   |   |
| 3 |   |   | 2 | 5 | 4 | 5 |   |
| 4 |   | 1 | 4 |   | 2 | 2 | 6 |
| 5 |   | 7 |   |   |   | 1 | 1 | 10 |

S$_{10}$

FIG. 7C  STEP 46

|   | G | F | E | D | C | B | A |
|---|---|---|---|---|---|---|---|
| 1 |   |   |   |   |   |   |   |
| 2 |   | 7 | 7 | 6 | 3 |   |   |
| 3 |   |   | 2 | 5 | 4 | 5 |   |
| 4 |   | 1 | 4 |   | 2 | 2 | 6 |
| 5 |   | 7 |   |   |   | 1 | 1 |   |

S$_{11}$  S$_{10}$

FIG. 7D  STEP 47

|   | G | F | E | D | C | B | A |
|---|---|---|---|---|---|---|---|
| 1 |   |   |   |   |   |   |   |
| 2 |   | 7 | 7 | 6 | 3 |   |   |
| 3 |   |   | 2 | 5 | 4 | 5 |   |
| 4 |   | 1 | 4 |   | 2 | 2 | 6 |
| 5 |   | 7 |   |   |   | 1 | 1 |   |

S$_{11}$  S$_{10}$

FIG. 7E  STEP 49

FIG. 7F  STEP 56

FIG. 7G  STEP 56

FIG. 7H  STEP 47

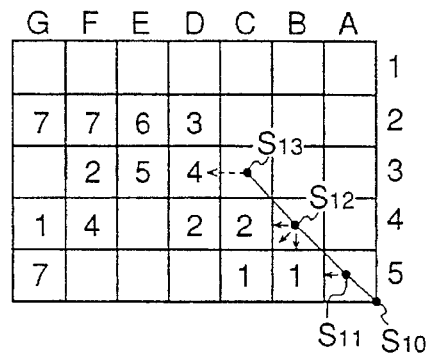
FIG. 7I    STEP 50
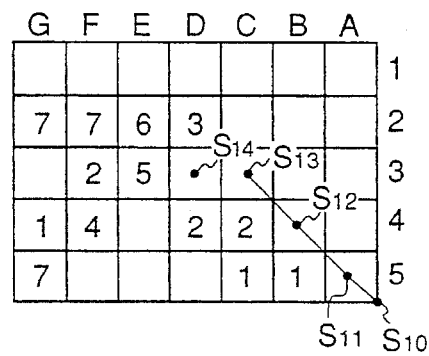
FIG. 7J    STEP 52
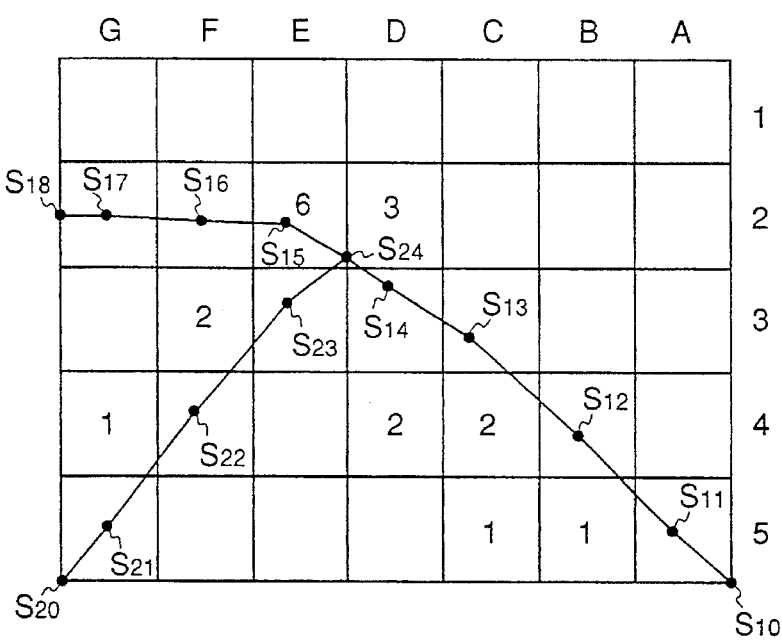
FIG. 8
STEP 56

FIG. 10A

| FE1 | $S_{10}$ | $S_{11}$ | $S_{12}$ | $S_{13}$ | $S_{14}$ | $S_{15}$ | $S_{16}$ | $S_{17}$ | $S_{18}$ | |
|---|---|---|---|---|---|---|---|---|---|---|
|  | 1.0 | 1.0 | 0.6 | 0.5 | 0.4 | 0.6 | 0.7 | 0.7 | 0.7 | |
| FE2 | $S_{20}$ | $S_{21}$ | $S_{22}$ | $S_{23}$ | $S_{24}$ | | | | | |
|  | 0.7 | 0.7 | 0.4 | 0.5 | 0.45 | | | | | |
| | | | | | | | | | | |
| | | | | | | | | | | |

FIG. 10B

| FE1 | $S_{10}$ | $S_{11}$ | $S_{12}$ | $S_{13}$ | $S_{14}$ | $S_{15}$ | $S_{16}$ | $S_{17}$ | $S_{18}$ | |
|---|---|---|---|---|---|---|---|---|---|---|
|  | 1.05 | 1.05 | 0.83 | 0.68 | 0.64 | 0.725 | 0.75 | 0.75 | 0.75 | |
| FE2 | $S_{20}$ | $S_{21}$ | $S_{22}$ | $S_{23}$ | $S_{24}$ | | | | | |
|  | 0.75 | 0.75 | 0.5 | 0.65 | 0.67 | | | | | |
| | | | | | | | | | | |
| | | | | | | | | | | |

FIG.17A STEP87

FIG.17B STEP88

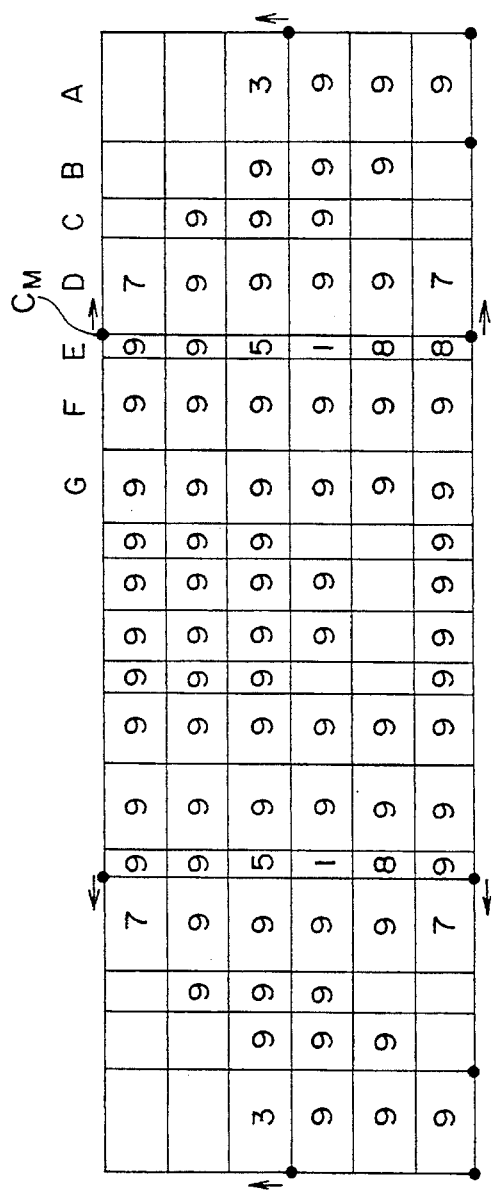
FIG.17C  STEP89
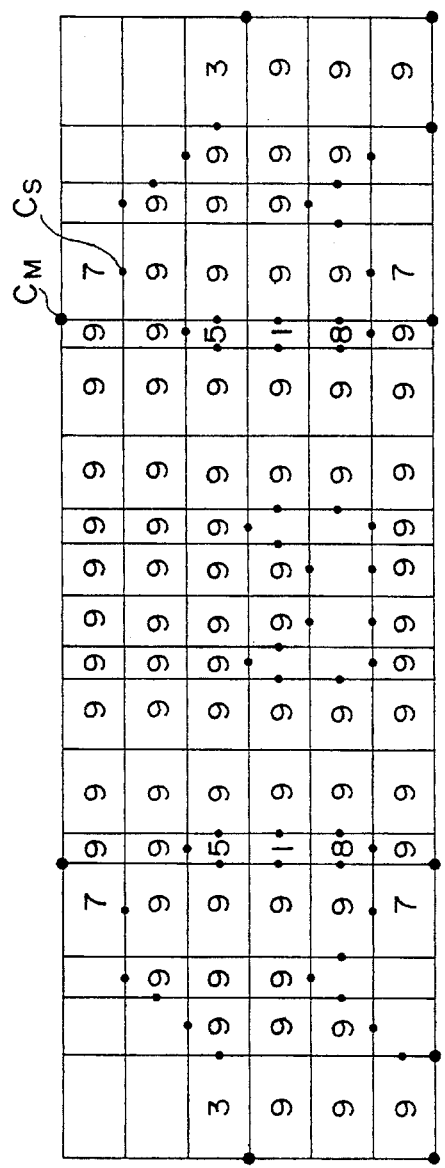
FIG.17D  STEP90

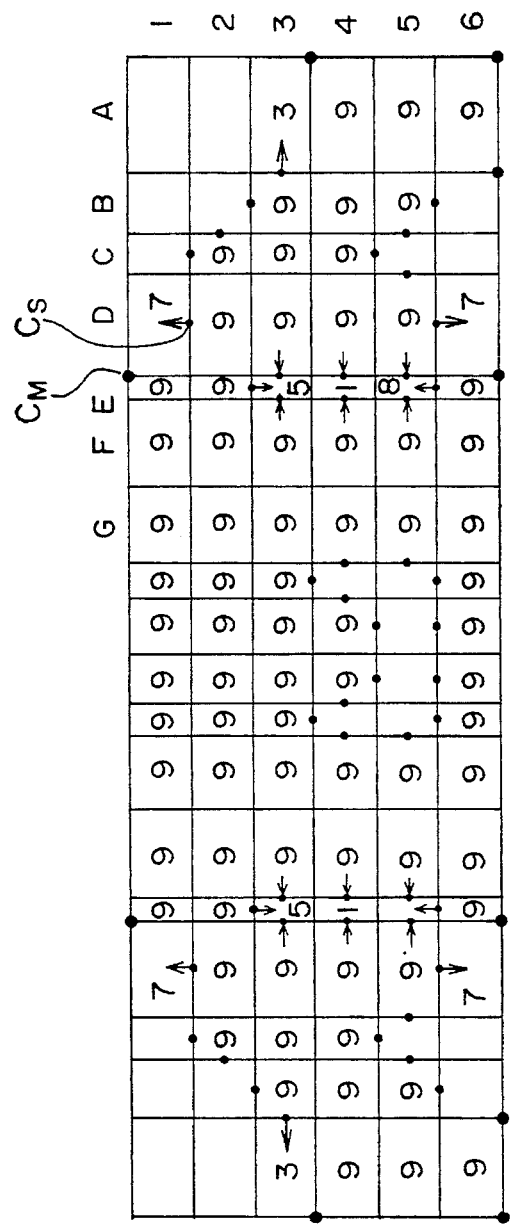
FIG.17E STEP91

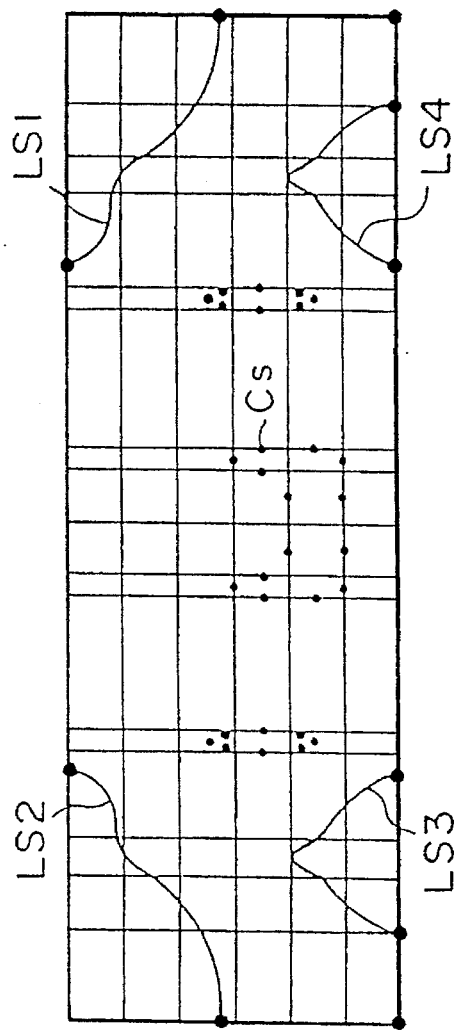
FIG. 17F STEP 92
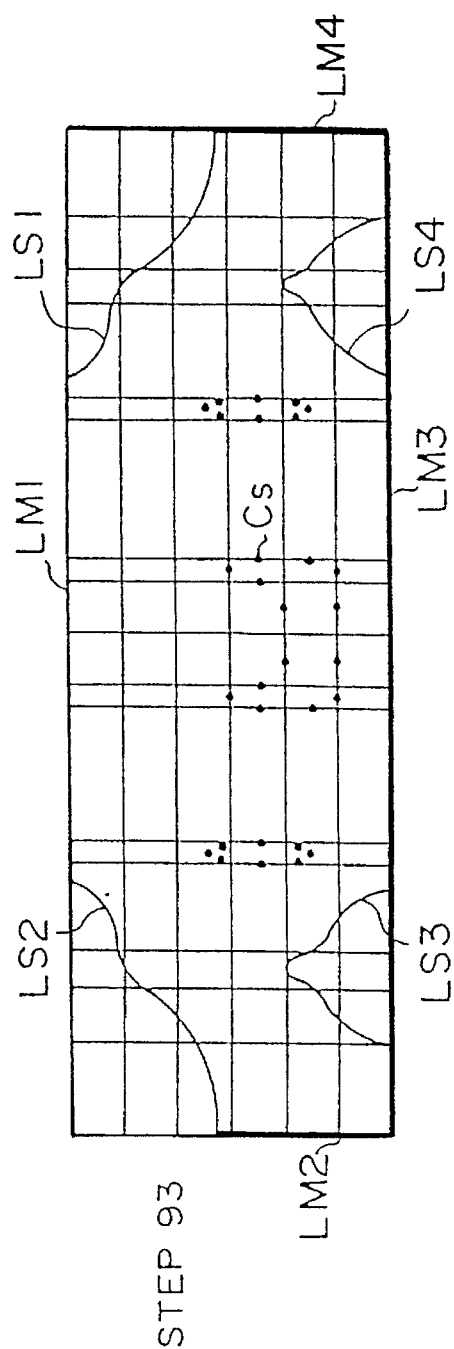
FIG. 17G STEP 93

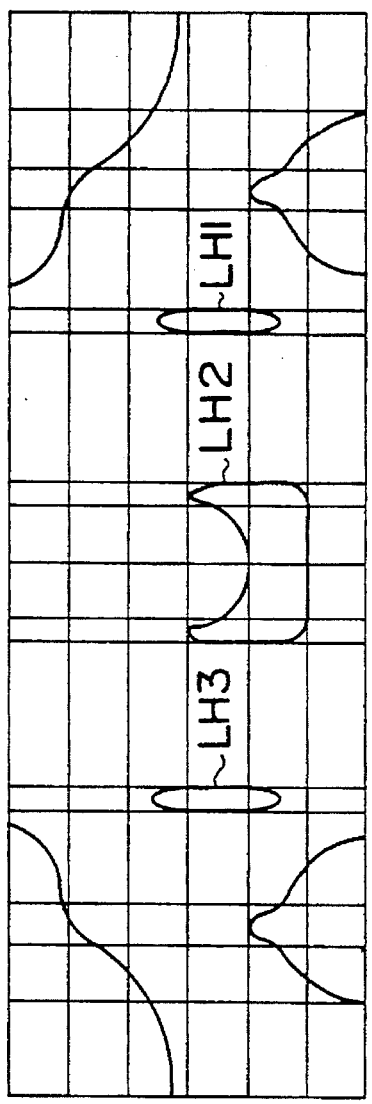
FIG. 17H  STEP 94

FIG. 18A

|   | K | J | I | H | G | F | E | D | C | B | A |
|---|---|---|---|---|---|---|---|---|---|---|---|
| 1 | ▨ | ▨ | ▨ | ▨ | ▨ | ▨ | ▨ | ▨ | ▨ | ▨ | ▨ |
| 2 |   | 2 | 6 | 6 | 2 |   | 2 | 7 | 6 | 5 | ▨ |
| 3 |   |   |   | 1 | 6 | 2 |   | 2 | 7 | 7 | ▨ |
| 4 |   |   |   |   | 2 | 6 | 2 |   | 2 | 3 | ▨ |
| 5 |   |   |   |   | 1 | 2 | 6 |   |   | 1 | ▨ |

FIG. 18B

|   | K | J | I | H | G | F | E | D | C | B | A |
|---|---|---|---|---|---|---|---|---|---|---|---|
| 1 | ▨ | ▨ | ▨ | ▨ | ▨ | ▨ | ▨ | ▨ | ▨ | ▨ | ▨ |
| 2 |   | 2 | 6 | 6 | 2 |   | 2 | 7 | 6 | 5 | ▨ |
| 3 |   |   |   | 1 | 6 | 2 |   | 2 | 7 | 7 | ▨ |
| 4 |   |   |   |   | 2 | 6 | 2 |   | 2 | 3 | ▨ |
| 5 |   |   |   |   | 1 | 2 | 6 |   |   | 1 | ▨ |

FIG. 18C

|   | J | I | H | G | F | E |   |
|---|---|---|---|---|---|---|---|
| 2 | 2 | 6 | 6 | 2 |   |   |   |
| 3 |   |   | 1 | 6 | 2 |   |   |
| 4 |   |   |   | 2 | 6 | 2 |   |
| 5 |   |   |   | 1 | 2 | 6 |   |

FIG. 18D

|   | E | D | C | B |
|---|---|---|---|---|
| 2 | 2 | 7 | 6 | 5 |
| 3 |   | 2 | 7 | 7 |
| 4 |   |   | 2 | 3 |
| 5 |   |   |   | 1 |

FIG. 18E    STEPS 86 & 87

|   | J | I | H | G | F | E |   |
|---|---|---|---|---|---|---|---|
|   | 2 | 6 | 6 | 2 |   |   | 2 |
|   |   |   | 1 | 6 | 2 |   | 3 |
|   |   |   |   | 2 | 6 | 2 | 4 |
|   |   |   |   | 1 | 2 | 6 | 5 |

FIG. 18F    STEP 88

|   | J | I | H | G | F | E |   |
|---|---|---|---|---|---|---|---|
|   | 2 | 6 | 6 | 2 |   |   | 2 |
|   |   |   | 1 | 6 | 2 |   | 3 |
|   |   |   |   | 2 | 6 | 2 | 4 |
|   |   |   |   | 1 | 2 | 6 | 5 |

FIG. 18G    STEP 89

|   | J | I | H | G | F | E |   |
|---|---|---|---|---|---|---|---|
|   | 2 | 6 | 6 | 2 |   |   | 2 |
|   |   |   | 1 | 6 | 2 |   | 3 |
|   |   |   |   | 2 | 6 | 2 | 4 |
|   |   |   |   | 1 | 2 | 6 | 5 |

FIG. 18H    STEP 90

|   | J | I | H | G | F | E |   |
|---|---|---|---|---|---|---|---|
|   | 2 | 6 | 6 | 2 |   |   | 2 |
|   |   |   | 1 | 6 | 2 |   | 3 |
|   |   |   |   | 2 | 6 | 2 | 4 |
|   |   |   |   | 1 | 2 | 6 | 5 |

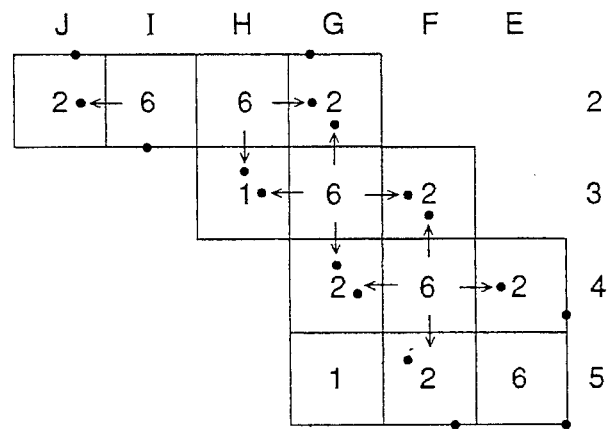
FIG. 18I  STEP 91
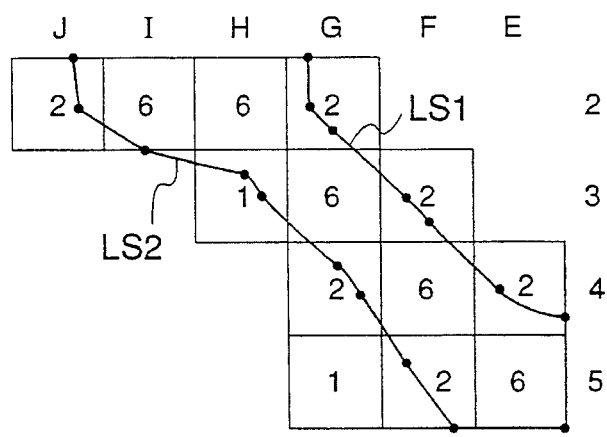
FIG. 18J  STEP 92

STEP 93

METHOD OF DESIGNING OPTIMUM SKELETON AND PLATE STRUCTURES

BACKGROUND OF THE INVENTION

The present invention generally relates to methods of designing skeleton and plate structures, and more particularly to a method of designing optimum skeleton and plate structures which uses a computer to obtain more realistic skeleton and plate structures from a density distribution which is obtained as an optimum shape of a mechanical structure by a conventional shape optimizing design.

According to the conventional shape optimizing design (or modeling), the optimum shape of the mechanical structure is obtained in the following manner by use of the computer.

(1) For example, a rectangle is given as a design region in the case of 2 dimensions, and a rectangular parallelopiped is given as the design region in the case of 3 dimensions.

(2) The design region is divided into finite elements $E_i$, where $i=1, \ldots, N$, densities $D_i$ are given to the finite elements $E_i$, and the densities $D_i$ or parameters thereof are set as design variables.

(3) Load conditions, support conditions and a total volume VT are given as restricting conditions with respect to the design region. The load conditions include points or regions where the load is applied, the magnitude of the load, and the direction of the load. The support conditions include points or regions where the support takes place, and support methods such as movable, rotatable and restriction. The total volume VT is a volume integral (integration value) of the density within the design region. An external force is applied to each of the load points and support points.

(4) A density distribution within the design region is obtained for a case where a target function f which is a function of the design variables becomes a maximum or a minimum.

(5) A shape which is obtained by eliminating the finite elements having a density which is 0 or a density less than a predetermined value is smoothened by a Bezier curve so as to obtain an optimum shape.

As specific techniques for making the shape optimizing design, there are techniques which use a homogenization method. For example, such a technique using the homogenization method is proposed in Suzuki et al., "A Homogenization Method for Shape and Topology Optimization", Computer Methods in Applied Mechanics and Engineering, 1991.

A description will be given of this proposed technique using the homogenization method. In the case of 2 dimensions, a large number of small rectangular holes are formed in a design region as shown in FIG. 1A, and it is assumed that the rectangular holes are arranged regularly. The finite element $E_i$ is made up of one or a plurality of unit cells $UC_i$ shown in FIG. 1B, and each unit cell $UC_i$ is a square having sides with a length "1" and includes the rectangular hole having a size of $a_i \times b_i$. The density $D_i$ of the finite element $E_i$ is equal to the density of the unit cell $UC_i$, and is described by the following formula.

$$D_i = 1 - a_i b_i$$

In general, the design variables are the lengths $a_i$ and $b_i$ of the sides of the rectangular hole and an inclination $\theta_i$, where $i=1, \ldots, N$. The target function f is described by the following average compliance, where F denotes an external force, u denotes a displacement satisfying the principle of a virtual work, V denotes a volume (integration variable) and the integration range is the design region.

$$f = \int F u \, dV$$

The displacement u is dependent on a resilient tensor of the finite element $E_i$. It is assumed that the resilient tensor of the finite element $E_i$ is equal to the resilient tensor for the case where the finite element $E_i$ is replaced by a plate having a uniform density.

A density distribution having a maximum rigidity is obtained when the average compliance becomes a minimum under the given total volume VT. In the case of 3 dimensions, it is basically the same for the case of the 2 dimensions described above.

However, according to the conventional shape optimizing design, it was impossible to obtain the skeleton structure by the 2 or 3 dimensional design and the plate structure by the 3 dimensional design. Hence, the conventional shape optimizing design merely provided hints to the designer as to the shape, and considerable time was required until a final shape design is made.

SUMMARY OF THE INVENTION

Accordingly, it is a general object of the present invention to provide a novel and useful method of designing optimum skeleton and plate structures, in which the problems described above are eliminated.

Another and more specific object of the present invention is to provide a method of designing an optimum skeleton structure by using a computer to obtain a skeleton structure from a density distribution within a 2 or 3 dimensional design region which is obtained as an optimum shape of a mechanical structure, where the design region is divided into finite elements each having a density D assigned thereto, and the method comprises the steps of (a) inputting a first reference value $D_S$ of the density D, (b) regarding a point within the design region where an external force is applied as one of starting point candidates, (c) selecting a starting point which is non-selected from the starting point candidates, (d) extending a line from the starting point and passing through the finite element satisfying $D \geq D_S$ so that the line is as straight as possible, and (e) stopping the extension of the line and regarding the line as a skeleton member when no adjacent finite element satisfying $D \geq D_S$ exists or when a non-selected starting point candidate is reached, where the steps (c) through (e) are repeated until no more non-selected starting point candidate exists. According to the method of the present invention, it is possible to easily obtain the skeleton structure of the 2 or 3 dimensional design from the density distribution which is obtained by the optimum shape design. For this reason, it is possible to reduce the time required until the final shape design is made. Therefore, the present invention can shorten the appointed date of delivery and also reduce the design cost.

Still another object of the present invention is to provide a method of designing an optimum plate structure by using a computer to obtain a plate structure from a density distribution within a 3 dimensional design region which is obtained as an optimum shape of a mechanical structure, where the design region is divided into finite elements each having a density D assigned thereto, and the method comprises the steps of (a) inputting a reference value $D_S$ of the density D and specifying a rib design plane within the design region, (b) obtaining a rib schematic region satisfying $D \geq D_S$ within the rib design plane (c) regarding a vertex of a cross section of a finite element on a boundary of the rib design plane within the rib schematic region as a rib boundary point, (d) regarding a point on a side common with a cross section of a finite element satisfying $D<D_S$ within the rib schematic region as the rib boundary point, and (e) forming a closed rib boundary line by connecting mutually closest rib boundary points within a cross section of the same finite element or within cross sections of adjacent finite elements. According to the method of the present invention, it is possible to easily obtain the plate structure of the 3 dimensional design from the density distribution which is obtained by the optimum shape design. For this reason, it is possible to reduce the time required until the final shape design is made. Therefore, the present invention can shorten the appointed date of delivery and also reduce the design cost.

Other objects and further features of the present invention will be apparent from the following detailed description when read in conjunction with the accompanying drawings.

BRIEF DESCRIPTION OF THE DRAWINGS

FIGS. 7A, 7B, 7C, 7D, 7E, 7F, 7G, 7H, 7I and 7J respectively are diagrams for explaining the processes shown in FIGS. 9A and 9B;

FIG. 8 is a diagram for explaining the process shown in FIG. 9B;

FIGS. 10A and 10B respectively are diagrams for explaining a skeleton table;

FIGS. 17A, 17B, 17C, 17D, 17E, 17F, 17G and 17H respectively are diagrams for explaining the processes shown in FIGS. 14A and 14B;

FIGS. 18A, 18B, 18C, 18D, 18E, 18F, 18G, 18H, 18I and 18J respectively are diagrams for explaining the processes shown in FIGS. 14A and 14B.

DESCRIPTION OF THE PREFERRED EMBODIMENTS

First, a description will be given of the operating principle of one aspect of the present invention, by referring to FIG. 2.

According to one aspect of the present invention, an optimum skeleton structure design method uses a computer to obtain a skeleton structure from a density distribution within a 2 or 3 dimensional design region which is obtained as an optimum shape of a mechanical structure. The design region is divided into finite elements, and a density D is given to each finite element. The following steps 1A through 5A are carried out, and the steps 2A through 5A are repeated until no more non-selected starting point candidate exists.

Figure 1A:
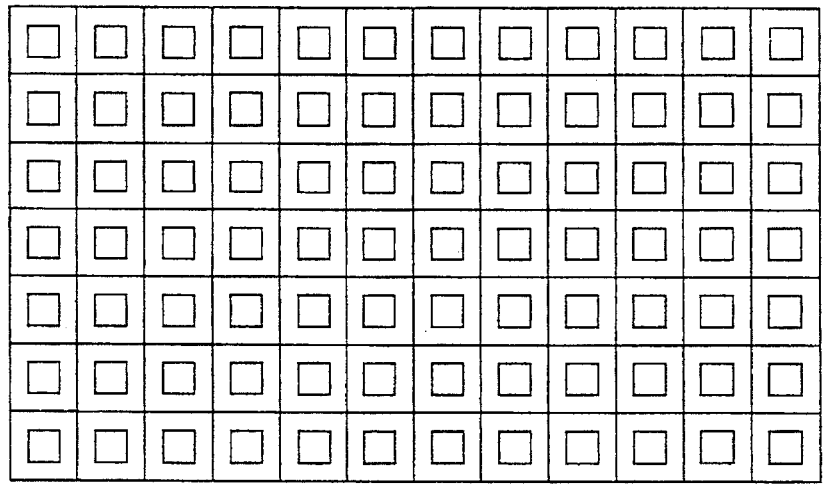
FIGS. 1A and 1B respectively are diagrams for explaining a conventional shape optimizing design using homogenization method.
Figure 1B:
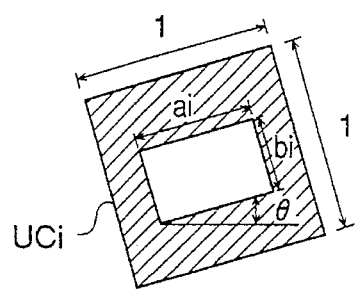
Figure 2:
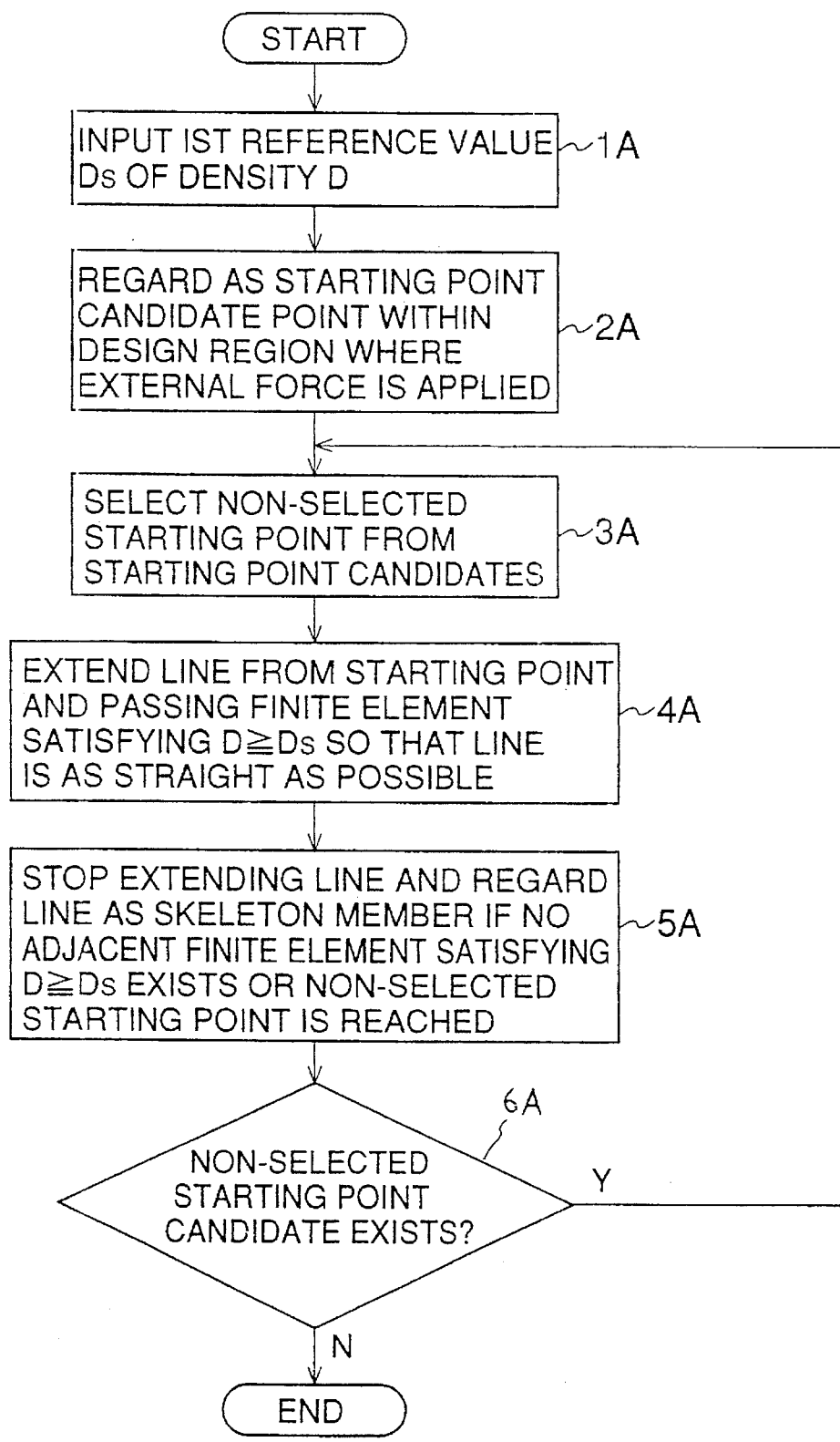
FIG. 2 is a flow chart for explaining the operating principle of one aspect of the present invention.

In FIG. 2, the step 1A inputs a first reference value $D_S$ of the density D. The step 2A regards as the starting point candidate a point within the design region where an external force is applied. The step 3A selects a non-selected starting point from the starting point candidates. The step 4A extends a line which starts from the starting point and passes through the finite elements satisfying $D \geq D_S$ in a manner such that the line becomes straight as possible. The step 5A stops extending the line and regards it as a skeleton member when no adjacent finite element satisfying $D \geq D_S$ exists or when a non-selected starting point candidate is reached.

A step 6A decides whether or not non-selected starting point candidate exists, and the process returns to the step 3A if the decision result is YES.

According to the present invention, the skeleton structure of the 2 or 3 dimensional design can easily be obtained from the density distribution that is obtained by the optimum shape design. Hence, it is possible to reduce the time required for the final shape design.

As a first method, the step 4A may select a middle point of the finite element as a skeleton forming point, and form the above line by connecting the present selected skeleton forming point and the previously selected skeleton forming point. In this case, the forming of the skeleton member is facilitated.

As a second method, when extending a straight line from the previously selected skeleton forming point to the present selected skeleton forming point according to the first method above, a middle point of the adjacent finite element is regarded as the next skeleton forming point if the adjacent finite element is located on the extension of the straight line and the density of the adjacent finite element satisfies $D \geq D_S$. In this case, the skeleton member becomes more linear, and a more realistic skeleton structure can be obtained.

As a third method, when the conditions used in the second method above are not satisfied, the following steps are taken. That is, the finite element which forms a minimum angle to the extension line is selected from the finite elements which share a portion of a joint with the finite element including the present selected skeleton forming point, do not yet include the skeleton forming point, and satisfy $D \geq D_S$. A center of this selected finite element is regarded as the next skeleton forming point. In this case, the skeleton member becomes more linear, and a more realistic skeleton structure can be obtained.

As a fourth method, the step 1A may also input a second reference value $D_H$ of the density, and the step 2A may also regard a point within the finite element satisfying $D \geq D_H$ as the starting point candidate. In this case, the skeleton structure is optimized, and it is possible to further increase the rigidity of the skeleton structure.

As a fifth method, the position of the skeleton forming point is shifted in each of the first through fourth method. In other words, the position of the skeleton forming point is shifted depending on the density of the finite elements which are in a vicinity of the skeleton forming point, located on both sides of a line of the skeleton member to which the skeleton forming point belongs, and through which another skeleton member to not pass. In this case, the skeleton structure is optimized, and it is possible to further increase the rigidity of the skeleton structure.

Next, a description will be given of the operating principle of another aspect of the present invention, by referring to FIG. 3.

According to this other aspect of the present invention, an optimum plate structure design method uses a computer to obtain a plate structure from a density distribution within a 3 dimensional design region which is obtained as an optimum shape of a mechanical structure. The design region is divided into finite elements, and a density D is given to each finite element. The following steps 1B through 5B are carried out.

Figure 3:
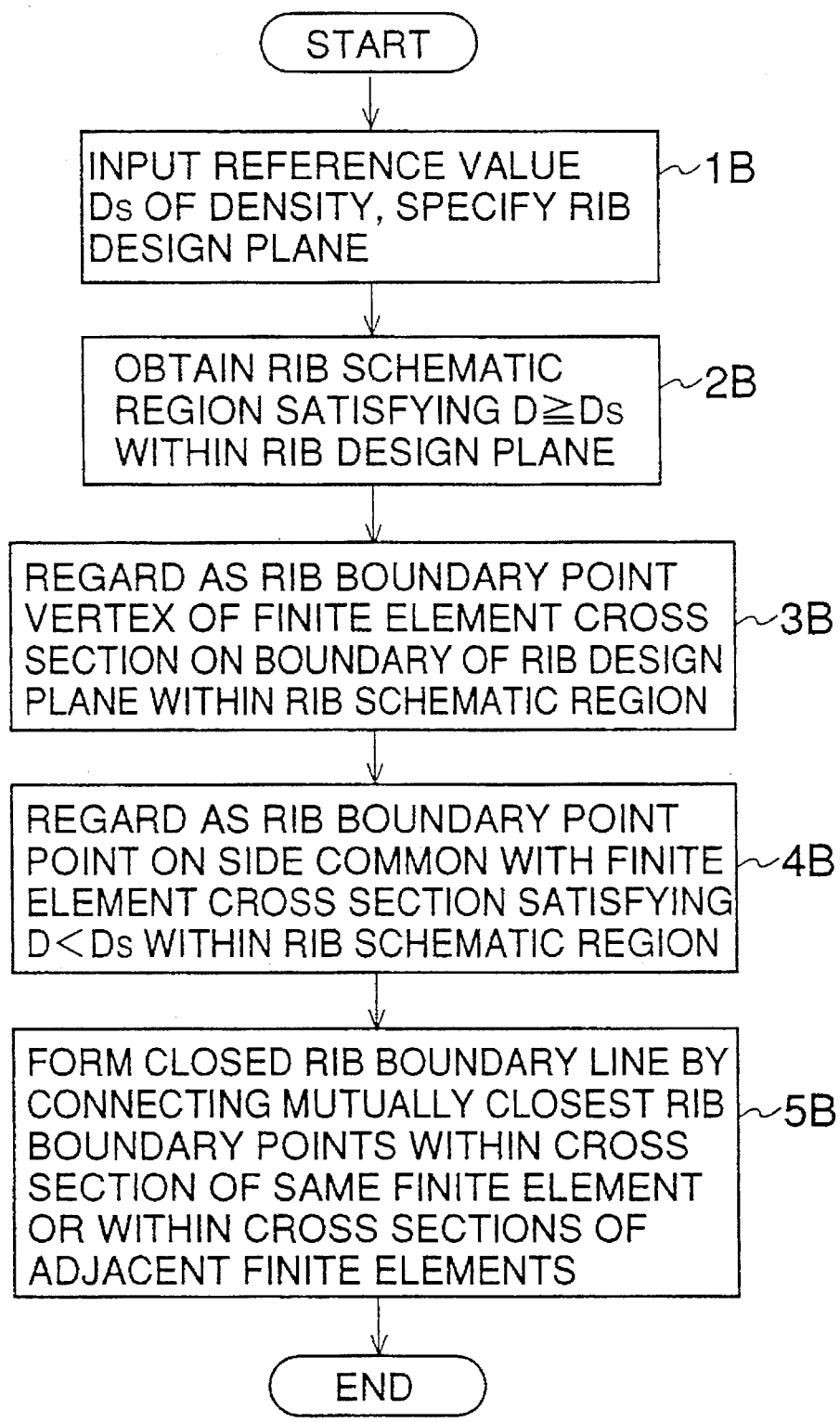
FIG. 3 is a flow chart for explaining the operating principle of another aspect of the present invention.

In FIG. 3, the step 1B inputs a reference value $D_S$ of the density D, and specifies a rib design plane within a design region. The step 2B obtains a rib schematic region satisfying $D \geq D_S$ within the rib design plane. The step 3B regards a cross section vertex of the finite element on a boundary of the rib design plane within the rib schematic region as a rib boundary point. The step 4B regards a point on a side which is common to the cross section of the finite element satisfying $D < D_S$ within the rib schematic region as the rib boundary point. The step 5B forms a closed rib boundary line by connecting the closest rib boundary points within the same finite element cross section or within the adjacent finite element cross sections.

According to the present invention, the plate structure of the 3 dimensional design can easily be obtained from the density distribution that is obtained by the optimum shape design. Hence, it is possible to reduce the time required for the final shape design.

As a first method, the step 1B specifies the finite element which is to be kept and is necessary from the functional and strength point of view. The step 2B eliminates the cross section of the specified finite element from the rib schematic region. The step 3B also regards as the rib boundary point a point on a boundary with the cross section of the finite element to be kept within the rib schematic region. In this case, the plate structure is further optimized.

As a second method, the position of the rib boundary point in the steps 3B and 4B is shifted depending on the density D of the cross section of the adjacent finite element satisfying $D < D_S$ on the rib design plane. In this case, the plate structure is further optimized, and it is possible to further increase the rigidity of the plate structure.

As a third method, the step 3B in the second method above regards the rib boundary point obtained in the step 3B as a first kinds of rib boundary point, and eliminates the first kind of rib boundary point common to the cross sections of a plurality of finite elements within the rib schematic region. In addition, the step 4B regards the rib boundary obtained in the step 4B as a second kind of rib boundary point. Further, the step 5B may include the following first through third steps. That is, the first step regards the first kind of rib boundary point as the starting point, successively connects the closest second kinds of rib boundary points within the same finite element cross section or within the adjacent finite element cross sections, and forms a second kind of rib boundary line which has as its terminating point another first kind of rib boundary point within the cross section of the finite element to which the second kind of rib boundary point belongs or within the cross section of the adjacent finite element. The second step forms a first kind of rib boundary line by connecting end points of different second kind of rib boundary lines along a design boundary line of the rib schematic region. The third step forms an extracted boundary line by connecting the closest non-connected second kind of rib boundary points within the same finite element cross section or within the adjacent finite element cross sections if the non-connected second kind of rib boundary points exist. In this case, the process is more suited for the operation of the computer, and it is possible to obtain a more positive processing result.

Next, a description will be given of a first embodiment of a method of designing optimum skeleton and plate structures according to the present invention.

First, a description will be given of the method of designing optimum skeleton structure. For the sake of convenience, the 2 dimensional design will be considered under the conditions shown in FIG. 4.

Figure 4:
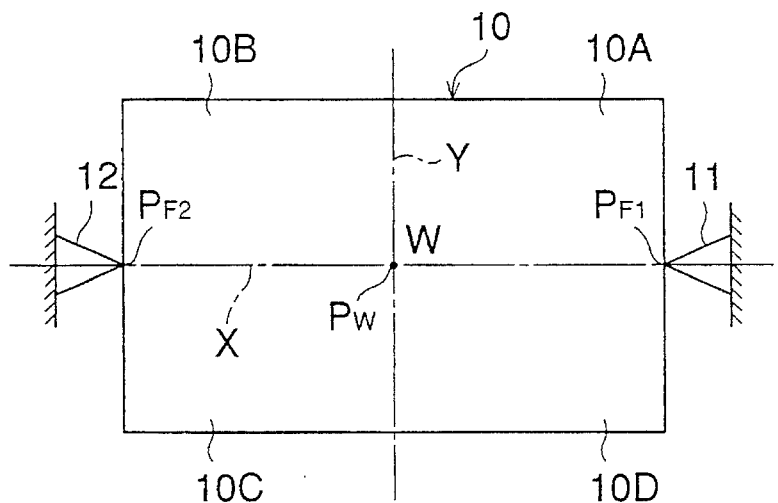
FIG. 4 is a diagram for explaining optimum shape design conditions of the first embodiment.

This design is made under the conditions that, restricting support points $P_{F1}$ and $P_{F2}$ on the right and left ends of a rectangular design region 10 are respectively restrictively supported by supports 11 and 12, and a load W is applied on a load point $P_W$ at the center of the design region 10 in a direction perpendicular to the paper in FIG. 4. When a X-axis which passes through the restricting support points $P_{F1}$ and $P_{F2}$ and the load point $P_W$ and a Y-axis which is on the design region 10 and passes through the load point $P_W$ and is perpendicular to the X-axis are considered, the conditions of the load and the restriction become symmetrical with respect to both the X-axis and the Y-axis. Hence, the optimum shape to be obtained also becomes symmetrical with respect to both the X-axis and the Y-axis.

Figure 5:
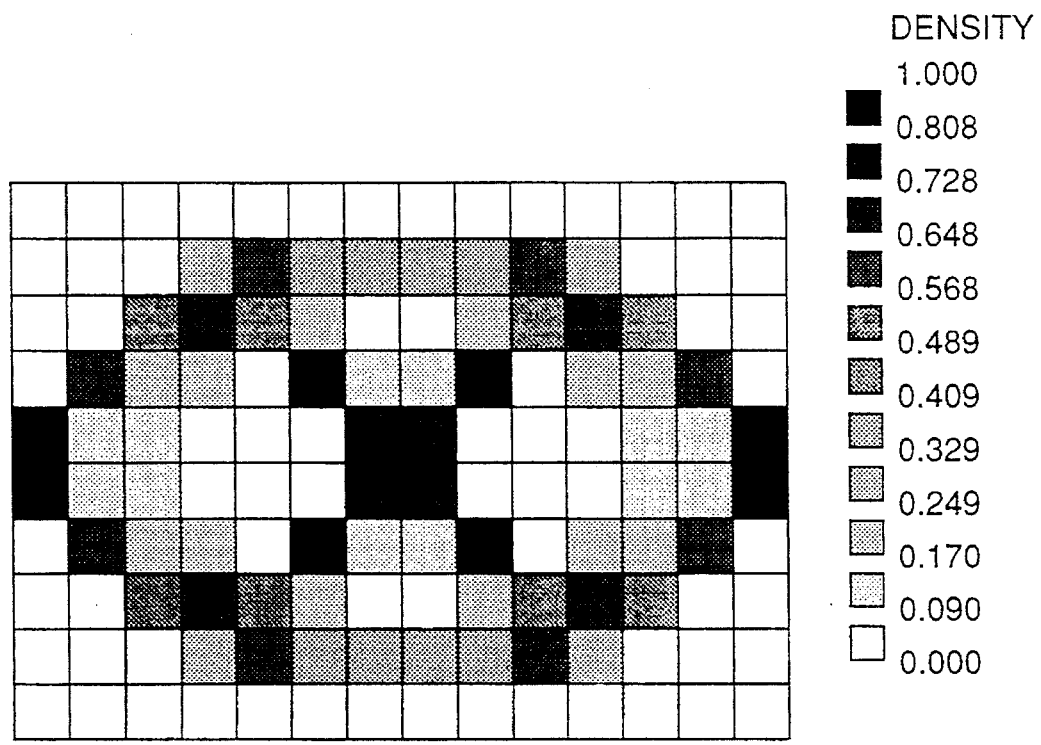
FIG. 5 is a diagram showing the densities of finite elements as tones when an optimum shape is obtained by use of the homogenization method.

FIG. 5 is a diagram showing, as tone, the density distribution which is obtained by applying the optimum shape design technique using the homogenization method to the design region 10. In FIG. 5, each small square corresponds to a finite element, and the density is obtained in units of finite elements. The hatching and the like used to indicate the various densities are indicated on the right hand side of FIG. 5. A sum total of the densities is the total volume VT. A density distribution having a maximum rigidity is obtained when the average compliance becomes a minimum under the given total volume VT.

Conventionally, the optimum shape was obtained for example by eliminating the white finite element and smoothening the boundary using the Bezier curve. However, when the optimum shape was to be designed in the skeleton structure, hints were merely provided to the designer as to the shape, and considerable time was required until a final skeleton structure is designed. Hence, this embodiment uses a design apparatus shown in FIG. 6 to automatically design the optimum skeleton structure.

Figure 6:
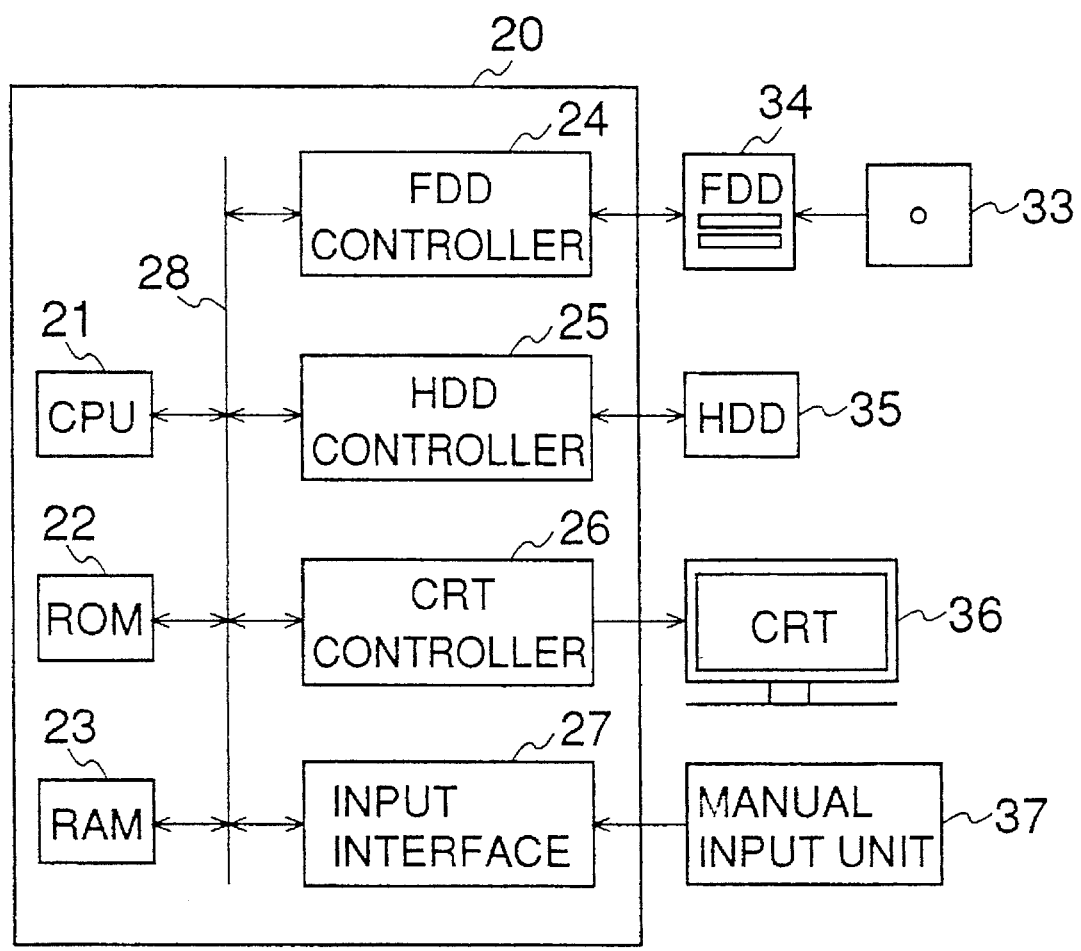
FIG. 6 is a system block diagram showing a design apparatus for designing optimum skeleton and plate structures.

The design apparatus shown in FIG. 6 generally includes a computer 20, a floppy disk driver (FDD) 34, a hard disk drive (HDD) 35, a cathode ray tube (CRT) display unit 36 and a manual input unit 37 which are connected as shown. The computer 20 may have a known construction. In this embodiment, the computer 20 includes a central processing unit (CPU) 21, a read only memory (ROM) 22, a random access memory (RAM) 23, a FDD controller 24, a HDD controller 25, a CRT controller 26, and an input interface 27 which are connected via a bus 28.

A bootstrap loader is stored in the ROM 22. Data related to the density distribution shown in FIG. 5 are stored in a floppy disk 33 which is loaded into the FDD 34. An operating system (OP) and a program for designing the optimum skeleton structure are stored in the HDD 35. The program and data above are loaded into the RAM 23 and processed by the CPU 21. For example, the manual input unit 37 includes a keyboard and a mouse. The above described data are input from the floppy disk 33 and necessary data which will be described are input, by manipulating the manual input unit 37 while monitoring a screen of the CRT display unit 36. The result of the automatic design is output in the form of a graphic display on the CRT display unit 36. The designer (operator) selects the material or the like and further makes a detailed design by monitoring this graphic display on the CRT display unit 36.

Because of the symmetrical nature of the design region 10 shown in FIG. 4, it is sufficient to design the optimum skeleton structure for a region 10A, for example, out of the regions 10A, 10B, 10C and 10D which are obtained by dividing the design region 10 into 4 regions along the X-axis and the Y-axis. FIGS. 7A through 7J and 8 are diagrams for facilitating the understanding of this design procedure. In the region 10A shown in FIGS. 7A through 7J and 8, the density of each finite element is multiplied by 10 and figures after the decimal point are rounded so as to illustrate the density by an integer, in order to simplify the description. In addition, the illustration of a density "0" is omitted in FIGS. 7A through 7J and 8.

Figures 7E, 7F, 7G, 7H:
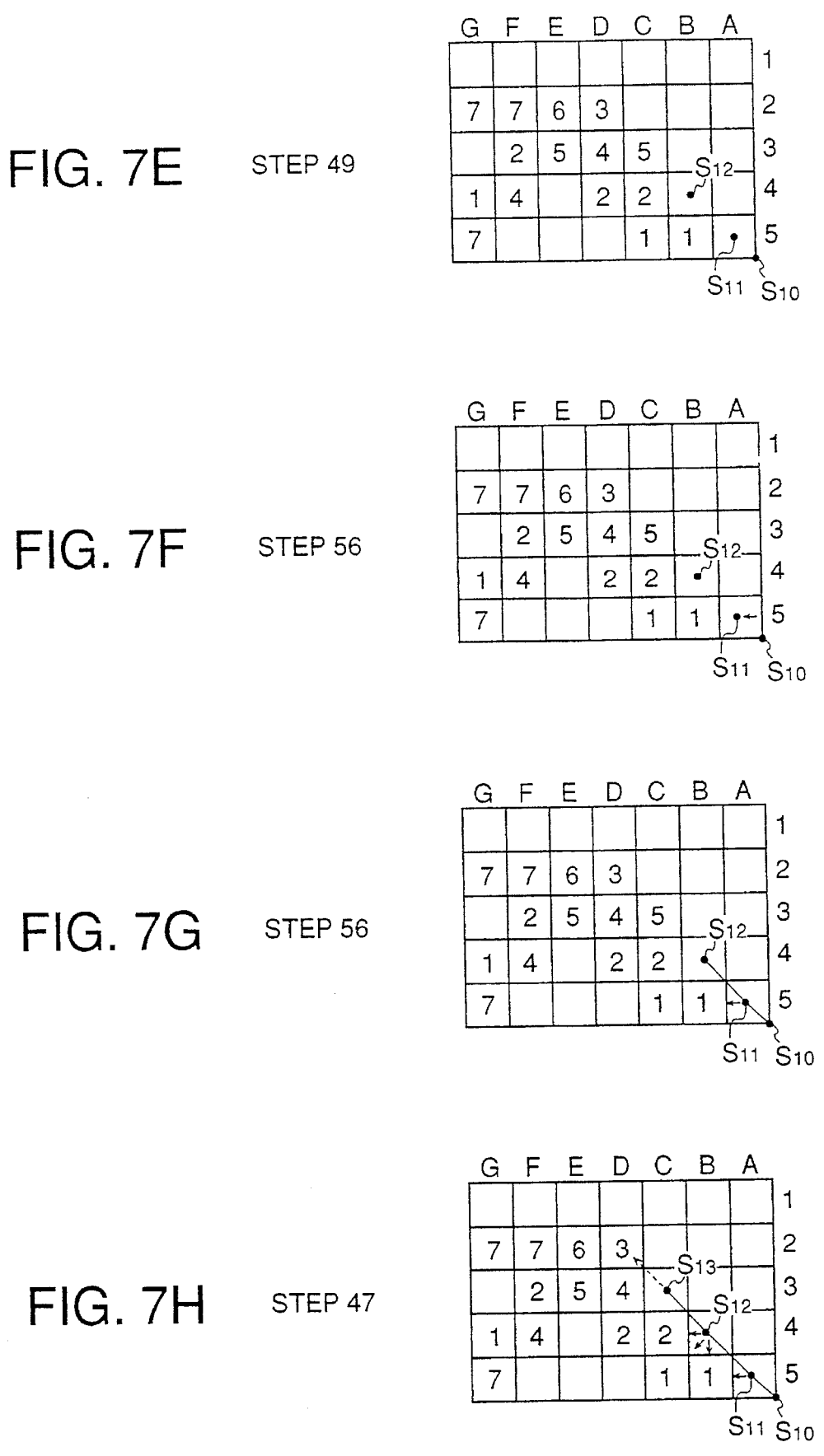

In FIGS. 7A through 7J and 8, the finite elements are identified by codes A through G and 1 through 5 shown outside the frame. For example, a finite element D3 has a density of 0.4, and a finite element B5 has a density of 0.1. In addition, joints at the 4 corners of each finite element are denoted by a, b, c and d as shown in FIG. 7A. For example, the joint a of a finite element C3 is illustrated as a joint C3a. The joint C3a is also a joint B3d, B4c or C4b.

Figure 9A:
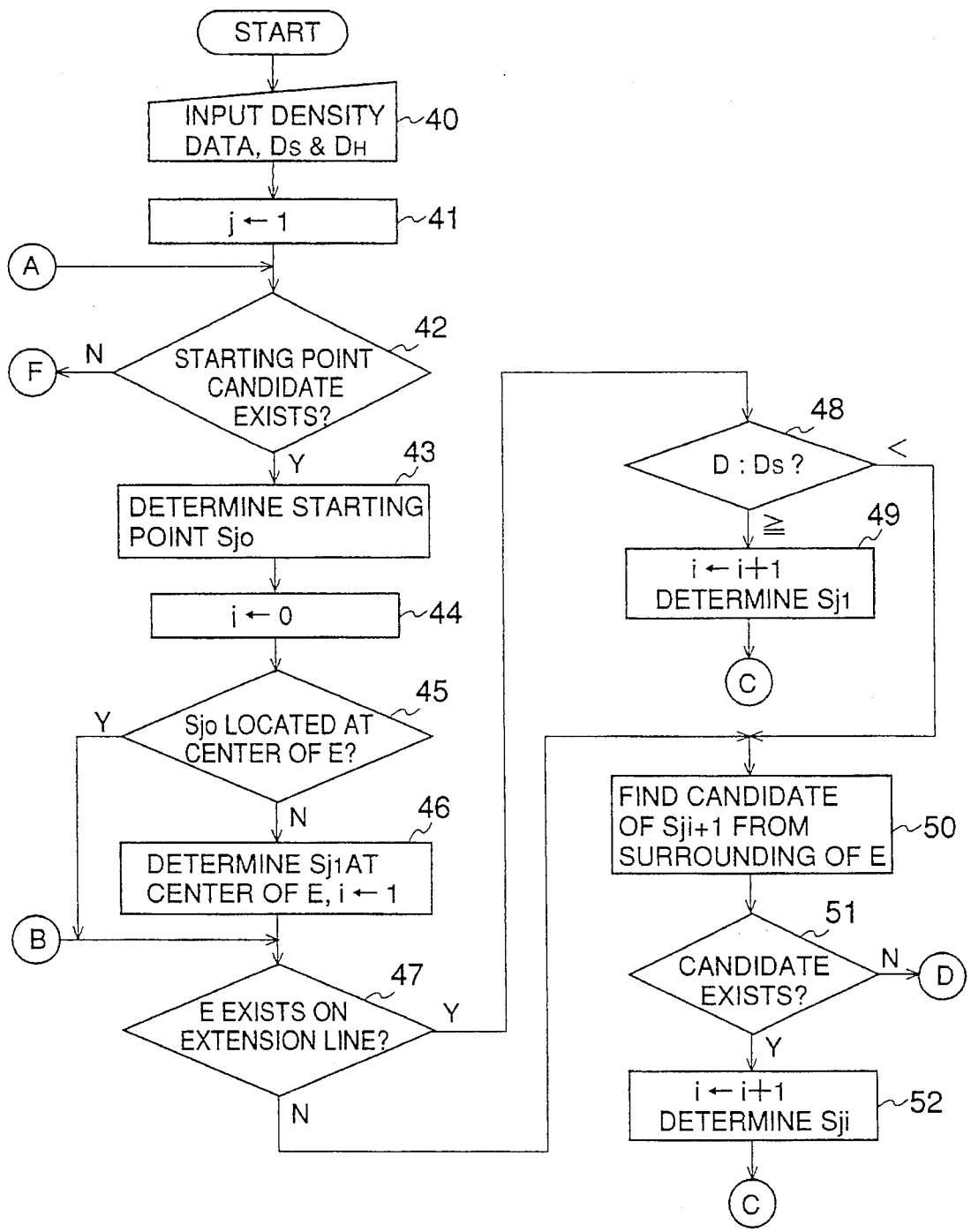
FIGS. 9A, 9B and 9C respectively are flow charts for explaining an optimum skeleton structure design procedure of a first embodiment of a method of designing optimum skeleton and plate structures according to the present invention.
Figure 9B:
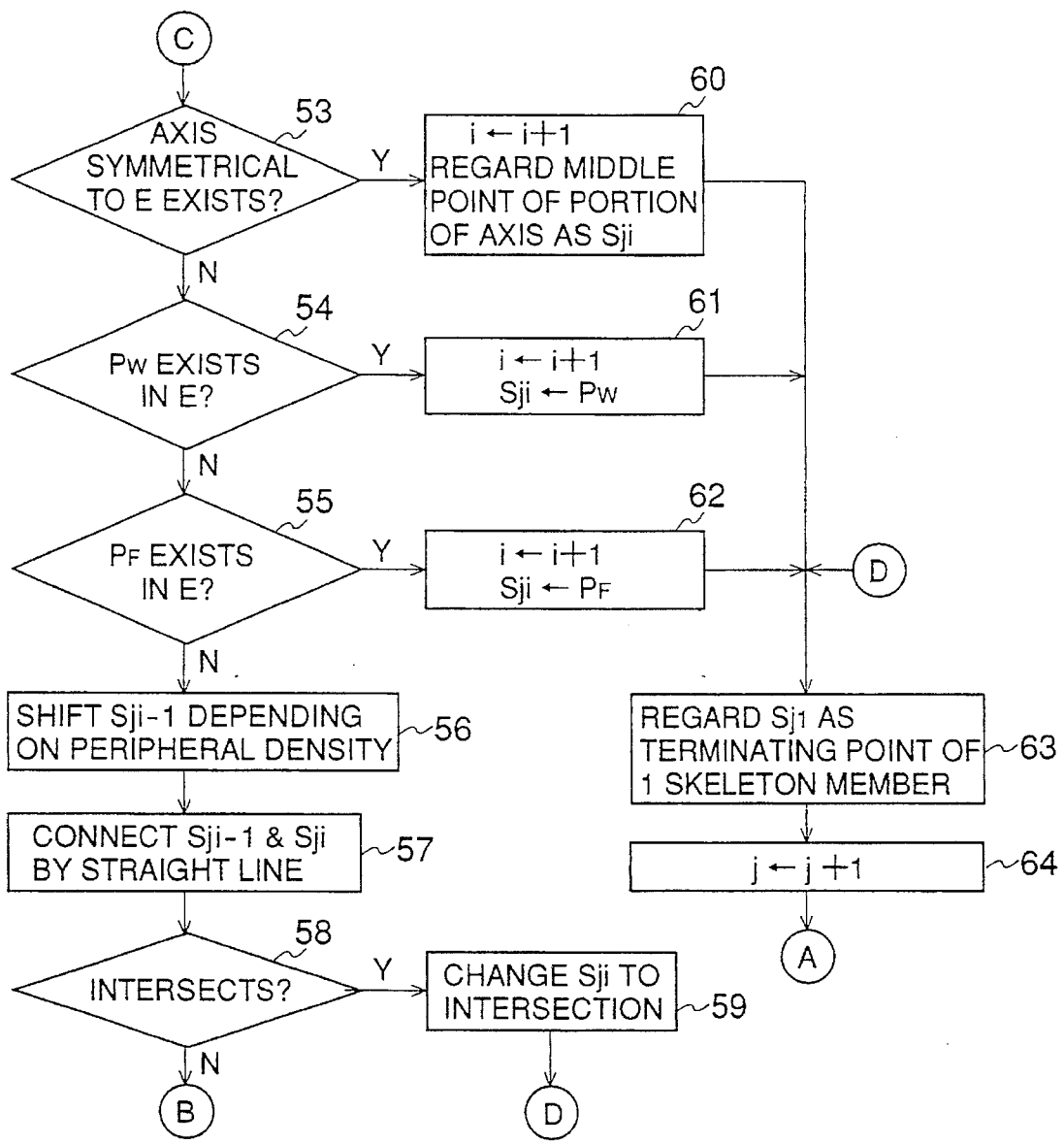
Figure 9C:
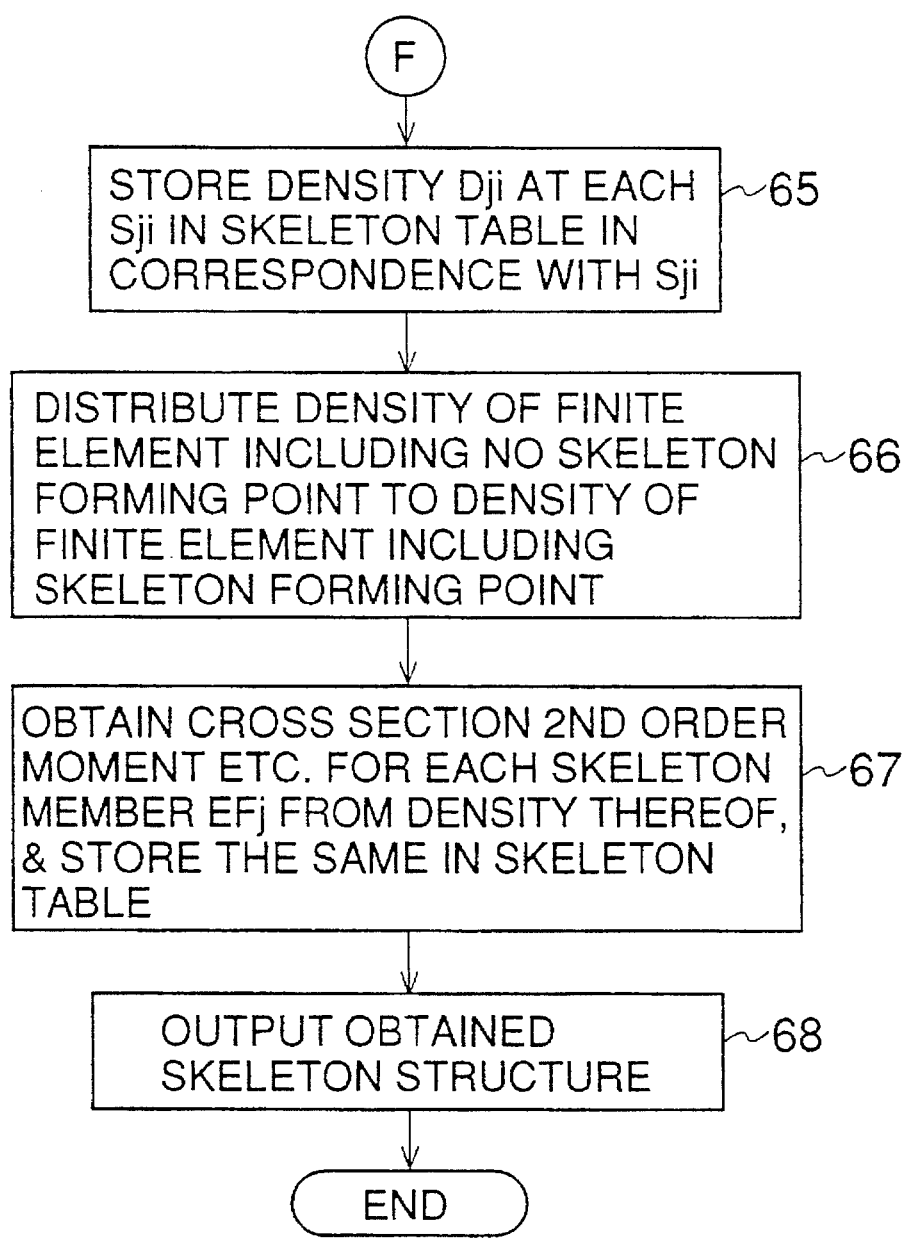

FIGS. 9A, 9B and 9C show the optimum skeleton structure design procedure. In FIGS. 9A through 9C, the following designations will be used in general. That is, E denotes a finite element, D denotes the density of the finite element E, $D_S$ and $D_H$ respectively denote first and second reference values of the density, S denotes a skeleton forming point, $FE_j$ denotes a jth skeleton member which is obtained by connecting the skeleton forming points by a straight line in the found order, $S_{ji}$ denotes an ith skeleton forming point of the skeleton member $FE_j$, $D_{ji}$ denotes the density of a finite element including the skeleton forming point $D_{ji}$, $P_W$ denotes a load joint, and $P_F$ denotes a restricting joint.

The flow charts of FIGS. 9A through 9C will now be described with reference to FIGS. 7A through 7J and 8.

In FIG. 9A, a step 40 loads the density data stored in the floppy disk 33 into the RAM 23 via the FDD 34 and the FDD controller 24, based on an operation of the manual input unit 37. Only the density data related to the region 10A out of the regions 10A through 10D forming the design region 10 are input because of the symmetrical nature of the density data related to the design region 10 shown in FIG. 4 with reference to the X-axis and the Y-axis. In addition, the step 40 inputs the first reference value $D_S$ and the second reference value $D_H$ by operating the manual input unit 37. In this embodiment, $D_S=0.4$ and $D_H=0.9$.

A step 41 substitutes 1 into j.

A step 42 finds a starting point candidate of the skeleton member. The starting point candidate is a center point of a finite element having a density greater than or equal to the load point $P_W$, the restricting support point $P_F$ and the second reference value $D_H$. An external force is applied at the load point and the support point, and the load point and the support point must be an end point of the skeleton member. In general, the density at the load point and the support point is greater than or equal to the second reference value $D_H$. By adding to the starting point candidate the center point of the finite element having the density greater than or equal to the second reference value $D_H$, the skeleton structure is further optimized, and it becomes possible to further increase the rigidity of the skeleton structure.

In other words, the step 42 decides whether or not an unused starting point candidate exists. The process advances to a step 43 if the decision result in the step 42 is YES, but the process advances to a step 63 shown in FIG. 9C if the decision result in the step 42 is NO. In FIG. 7A, when j=1, a joint G5d which is the load point $P_W$, and a joint A5a which is the restricting support point $P_{F1}$ are the starting point candidates.

The step 43 selects an arbitrary starting point candidate from the unused starting point candidates, and regards the selected arbitrary starting point candidate as a skeleton forming point $S_{j0}$. In FIG. 7B, when j=1, the joint A5a which is the restricting support point $P_{F1}$ is regarded as a skeleton forming point $S_{10}$.

A step 44 substitutes 0 into i.

A step 45 decides whether or not the skeleton forming point $S_{j0}$ is a center of the finite element E. The process advances to a step 46 if the decision result in the step 45 is NO, but the process advances to a step 47 if the decision result in the step 45 is YES.

The step 46 regards the center of the finite element E as a skeleton forming point $S_{j1}$, and substitutes 1 into i. In FIG. 7C, when j=1, the center of a finite element A5 is regarded as a skeleton forming point $S_{11}$.

The step 47 decides whether or not the finite element E exists on a line which is an extension of a straight line which connects skeleton forming points $S_{ji-1}$ and $S_{ji}$ and is extended from the skeleton forming point $S_{ji}$. The process advances to a step 48 if the decision result in the step 47 is YES, but the process advances to a step 50 if the decision result in the step 47 is NO. This is because it is more realistic that the skeleton member is a straight line. In FIG. 7D, when j=1 and i=1, it is decided that a finite element B4 exists. In FIG. 7H, when j=1 and i=3, it is decided that a finite element D2 exists.

The step 48 decides whether $D \geq D_S$ or $D < D_S$. The process advances to a step 49 if $D \geq D_S$, and the process advances to the step 50 if $D < D_S$. In FIG. 7D, when j=1 and i=1, $D \geq D_S$. In FIG. 7H, when j=1 and i=3, $D < D_S$.

The step 49 increments i by 1, and regards the center of the finite element E found in the step 47 as the skeleton forming point $S_{ji}$. This point $S_{ji}$ is a position without correction. Next, the process advances to a step 53 shown in FIG. 9B. In FIG. 7E, when j=1 and i=2, a center of a finite element B4 is regarded as a skeleton forming point $S_{12}$.

The step 50 searches for a candidate of a skeleton forming point $S_{ji+1}$ from the surrounding of the finite element E including the skeleton forming point $S_{ji}$. This candidate is a finite element which shares a portion of the joint of the finite element E, does not yet include a skeleton forming point of the jth skeleton member, and has a density greater than or equal to the first reference value $D_S$. In FIG. 7I, when j=1 and i=3, a finite element D3 is a candidate of a skeleton forming point $S_{14}$.

A step 51 decides whether or not a candidate exists. The process advances to a step 52 if the decision result in the step 51 is YES, and the process advances to a step 63 shown in FIG. 9B if the decision result in the step SS1 is No.

The step 52 increments i by 1, and regards as the skeleton forming point $S_{ji}$ a center of a finite element having a maximum density out of the candidates of the skeleton forming point $S_{ji}$. When a plurality of finite elements have the maximum density, the center of the finite element having a minimum angle to the extension line used in the step 47 is regarded as the skeleton forming point $S_{ji}$. Accordingly, the skeleton member becomes more linear, and a more realistic skeleton structure is obtained. The point $S_{ji}$ is a position having no correction. In FIG. 7J, when j=1 and i=4, the center of the finite element D3 is regarded as a skeleton forming point $S_{14}$.

In FIG. 9B, a step 53 decides whether or not a symmetrical axis (X-axis or Y-axis) exists in the finite element E which includes skeleton forming point $S_{ji}$ obtained in the step 49 or 52. The process advances to a step 54 if the decision result in the step 53 is NO, and the process advances to a step 60 if the decision result in the step 53 is YES.

The step 54 decides whether or not the load point $P_W$ exists in the finite element E which includes skeleton forming point $S_{ji}$ obtained in the step 49 or 52. The process advances to a step 55 if the decision result in the step 54 is NO, and the process advances to a step 61 if the decision result in the step 54 is YES.

The step 55 decides whether or not the restricting support point $P_F$ exists in the finite element E which includes skeleton forming point $S_{ji}$ obtained in the step 49 or 52. The process advances to a step 58 if the decision result in the step 55 is NO, and the process advances to a step 62 if the decision result in the step 55 is YES.

The step 58 shifts the skeleton forming point $S_{ji-1}$ which was previously determined one point before, depending on the peripheral density of the finite element E. This shift is a positional correction with respect to the point $S_{ji-1}$. For example, a shift vector from this point $S_{ji-1}$ is obtained as follows.

First, a density $D_p$ of a peripheral finite element $E_p$ which shares a joint with the finite element E including the point $S_{ji-1}$ and is not a skeleton forming point.

Second, a shift vector component in a direction towards a center of the peripheral finite element $E_p$ from the center of the finite element E is obtained. A shift quantity is set to $(D_p/D) \cdot d/2$, where D denotes the density of the finite element E and d denotes the length of one side of the finite element.

Third, the first and second processes described above are carried out for all of the peripheral finite elements which are not skeleton forming points, and the shift vector from the point $S_{ji}$ is obtained by synthesizing all of the shift vector components.

If it is assumed that d=1, and when j=1 and i=2, for example, a shift vector of a skeleton forming point $S_{11}$ at a center of a finite element A5 in FIG. 7F has a magnitude $(1/10) \cdot (1/2) = 0.05$ from the point $S_{11}$ in a direction towards a center of a finite element B5.

In addition, when j=1 and i=3, a shift vector of a skeleton forming point $S_{12}$ at a center of a finite element B4 in FIG. 7G has a magnitude $(2/6) \cdot (1/2) = 0.17$ from the point $S_{12}$ in a direction towards a center of a finite element C4, a magnitude $(1/6) \cdot (2\sqrt{2}/2) = 0.12$ from the point $S_{12}$ in a direction towards a center of a finite element C5, a magnitude $(1/6) \cdot (1/2) = 0.08$ from the point $S_{12}$ in a direction towards a center of a finite element B5, a magnitude 0 from the point $S_{12}$ in a direction towards a center of a finite element B3, a magnitude 0 from the point $S_{12}$ in a direction towards a center of a finite element A3, and a magnitude 0 from the point $S_{12}$ in a direction towards a center of a finite element A4.

By the above described shift, the skeleton structure is optimized, and it is possible to further increase the rigidity of the skeleton structure.

A step 57 connects the skeleton forming points $S_{ji-1}$ and $S_{ji}$ by a straight line. Actually, in a skeleton table such as that shown in FIG. 10A within the RAM 23, this step 57 corresponds to writing coordinate data of the skeleton forming point $S_{ji}$ next to coordinate data of the skeleton forming point $S_{ji-1}$ or, updating (in this case, the step 57 may be omitted) the coordinate data of the skeleton forming point $S_{ji}$ written in the skeleton table in the step 46 or 49. The skeleton forming point $S_{ji}$ shown in FIG. 10A is shown with its coordinate.

A step 58 decides whether or not the straight line connecting the skeleton forming points $S_{ji-1}$ and $S_{ji}$ intersects another skeleton member. The process advances to a step 59 if the decision result in the step 58 is YES, and the process returns to the step 47 shown in FIG. 9A if the decision result in the step 58 is NO.

The step 59 changes the skeleton forming point $S_{ji}$ into an intersection, and the process advances to the step 63. In FIG. 8, a skeleton forming point $S_{24}$ is the intersection.

If the decision result in the step 53 is YES, the step 60 increments i by 1, and regards a center point of a portion of the symmetrical axis within the finite element E as the skeleton forming point $S_{ji}$, and the process advances to the step 63.

If the decision result i the step 54 is YES, the step 61 increments i by 1, and regards the load point $P_W$ as the skeleton forming point $S_{ji}$, and the process advances to the step 63.

If the decision result i the step 55 is YES, the step 62 increments i by 1, and regards the restricting support point $P_F$ as the skeleton forming point $S_{ji}$, and the process advances to the step 63.

The step 63 regards the skeleton forming point $S_{ji}$ as a terminating point of one skeleton member.

A step 64 increments j by 1, and the process returns to the step 42 shown in FIG. 9A.

A step 65 shown in FIG. 9C regards a density $D_{ji}$ of the finite element including each skeleton forming point $S_{ji}$ as an initial value of the density of the skeleton forming point $S_{ji}$, and stores this initial value into the skeleton table as shown in FIG. 10A. The density of the skeleton forming point $S_{24}$ can be obtained from the surrounding densities by interpolation, and in this case, is approximately equal to an average value $(0.6+0.3+0.4+0.5)/4=0.45$ of the surrounding densities.

A step 66 distributes the density of the finite element including no skeleton forming point to the finite elements including the skeleton forming point. This process of the step 66 will be described in more detail by referring to FIGS. 11A and 11B which show the process for a particular case.

Figure 11A:
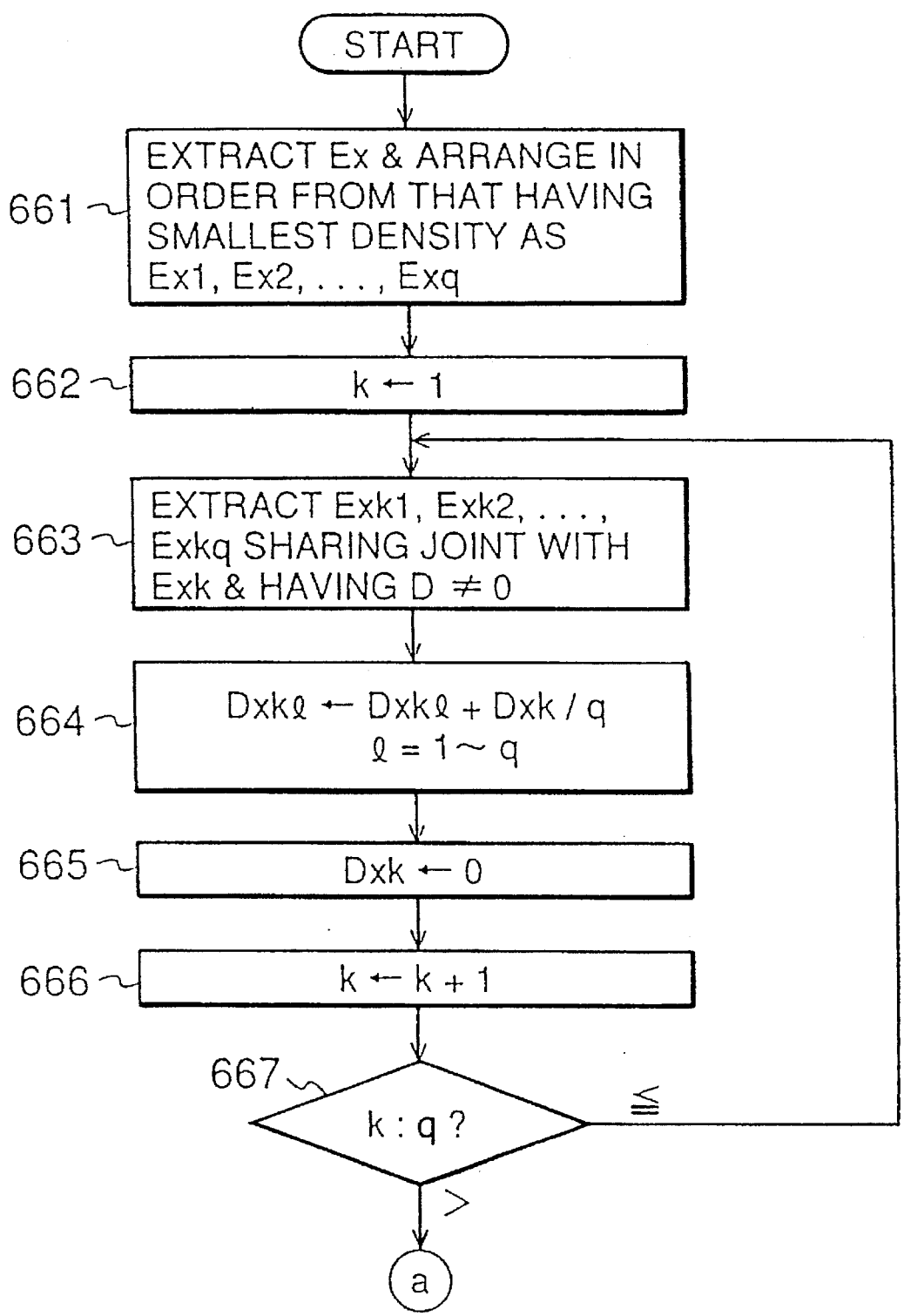
FIGS. 11A and 11B respectively are flow charts for explaining a step 66 shown in FIG. 9C in more detail.

In FIG. 11A, a step 661 extracts finite elements $E_x$ which do not share a joint with the finite element including the skeleton forming point and have a density D which is not 0, from within the region 10A, and arranges the extracted finite elements $E_x$ in an order $E_{x1}, E_{x2}, \ldots, E_{xq}$ starting from the finite element having the smallest density.

A step 662 substitutes an initial value 1 into k.

A step 663 extracts finite elements $E_{xk1}, E_{xk2}, \ldots, E_{xkq}$ which share a joint with the finite element $E_{xk}$ and have the density D which is not 0.

A step 664 distributes a density $D_{xk}$ of the finite element $E_{xk}$ to the finite elements $E_{xk1}, E_{xk2}, \ldots, E_{xkq}$. In other words, $D_{xk}/q$ is added to a density $D_{xk1}$ of a finite element $E_{xk1}$.

A step 665 sets a density $D_{xk}$ of the finite element $E_{xk}$ to 0.

A step 666 increments k by 1.

A step 667 decides whether k>q or k≦q. The process advances to a step 668 shown in FIG. 11B if k>q, and the process returns to the step 663 if k>q.

Figure 11B:
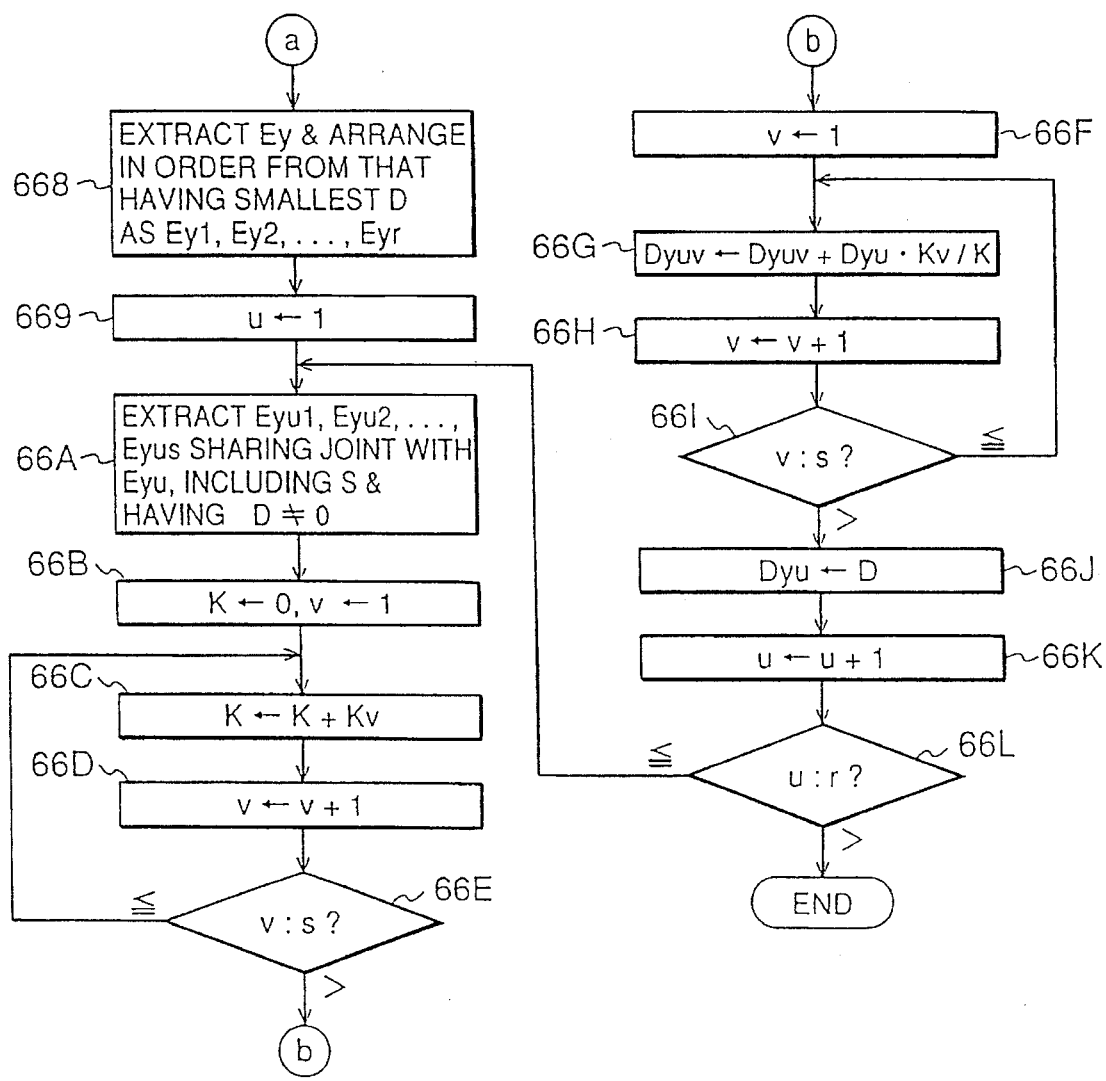

In FIG. 11B, the step 668 extracts finite elements $E_y$ which include no skeleton forming point, share a joint with the finite element including the skeleton forming point, and have the density D which is not 0, from within the region 10A, and arranges the extracted finite elements $E_y$ in an order $E_{y1}, E_{y2}, \ldots, E_{yr}$ starting from the finite element having the smallest density.

A step 669 substitutes an initial value 1 into u.

A step 66A extracts finite elements $E_{yu1}, E_{yu2}, \ldots, E_{yus}$ which share a joint with the finite element $E_{yu}$, include a skeleton forming point, and have the density D which is not 0.

A step 66B clears K to 0, and substitutes an initial value 1 into v.

A step 66C obtains a number $K_v$ of sharing joints between the finite element $E_{yu}$ and a finite element $E_{yuv}$, and adds this $K_v$ to K.

A step 66D increments v by 1.

A step 66E decides whether v>s or v≦s. The process advances to a step 66F if the v>s, and the process returns to the step 66C if v≦s.

The step 66F substitutes an initial value 1 into v.

Thereafter, following steps 66G through 66I are carried out to distribute the density $D_{yu}$ of the finite element $E_{yu}$ to the finite elements $E_{yu1}, E_{yu2}, \ldots, E_{yus}$ depending on the number of sharing joints.

More particularly, the step 66G adds $D_{yu} \cdot K_v/K$ to the density $D_{yuv}$ of the finite element $E_{yuv}$.

The step 66H increments v by 1.

The step 66I decides whether v>s or v≦s. The process advances to a step 66J if v>s, and the process returns to step 66G if v≦s.

The step 66J sets the density $D_{yu}$ of the finite element $E_{yu}$ to 0.

A step 66K increments u by 1.

A step 66L decides whether u>r or u≦r. The process ends if u>r, but the process returns to the step 66A if u≦r.

By the above described process carried out in the step 66 shown in FIG. 9C, the density of the finite element including no skeleton forming point is rationally aggregated into the density of the finite element including the skeleton forming point.

In FIG. 8, for example, K=1 for the finite element C5, and the density 0.1 of the finite element C5 is added to the density 0.6 of the finite element B4, so as to regard the density of the finite element B4 as being 0.7 and regard the density of the finite element C5 as being 0. In addition, K=1+2+1+2+2=8 for the finite element F3, and the density 0.2 of the finite element F3 is distributed to the finite elements G2, F2, E2, E3 and F4 as $0.2 \cdot 1/8=0.025$, $0.2 \cdot 2/8=0.05$, 0.025, 0.05 and 0.05, respectively. Hence in this latter case, the densities 0.7, 0.7, 0.8, 0.5 and 0.4 of the finite elements G2, F2, E2, E3 and F4 are respectively regarded as being 0.725, 0.75, 0.625, 0.55 and 0.45, and the density of the finite element F3 is regarded as being 0.

The densities within the skeleton table shown in FIG. 10A become as shown in FIG. 10B by carrying out the process of the step 66.

Returning now to the description of FIG. 9C, a step 67 obtains a cross section second order moment and the like for each skeleton member from the density of each skeleton member, and stores the obtained cross section second order moment and the like in the skeleton table. The cross section second order moment is obtained in the following manner, for example.

A cross sectional area and a cross sectional shape of a skeleton forming point included in the finite element having the maximum density in the skeleton member are input. The cross sectional shape of the maximum density is input by selecting a shape name from a plurality of shape names displayed on the screen. For example, the shape names displayed on the screen are rectangle, circle, hollow rectangle, hollow circle, mountain shape with equal sides, mountain shape with unequal sides and the like. If the cross sectional area of the circular cross section is 1, for example, the cross sectional second order moment can be described by $\pi \cdot (1/\pi)^4/4 = 0.07957$.

A step 68 stores the skeleton table in the HDD driver 35 shown in FIG. 6, and a graphic display of the skeleton structure is made on the CRT display unit 36 based on this skeleton table. The process ends after the step 68.

According to this first embodiment, it is possible to easily obtain the skeleton structure from the density distribution which is obtained by the optimum shape design, and the time required until the final shape design is made can be shortened.

In this first embodiment, the method of designing the optimum skeleton structure is applied to the 2 dimensional design. However, it is of course possible to apply the method designing the optimum skeleton structure to the 3 dimensional design.

Next, a description will be given of a method of designing optimum skeleton and plate structures according to the present invention.

A description will be given of the method of designing optimum plate structure. For the sake of convenience, the 3 dimensional design will be considered under the conditions shown in FIG. 12.

Figure 12:
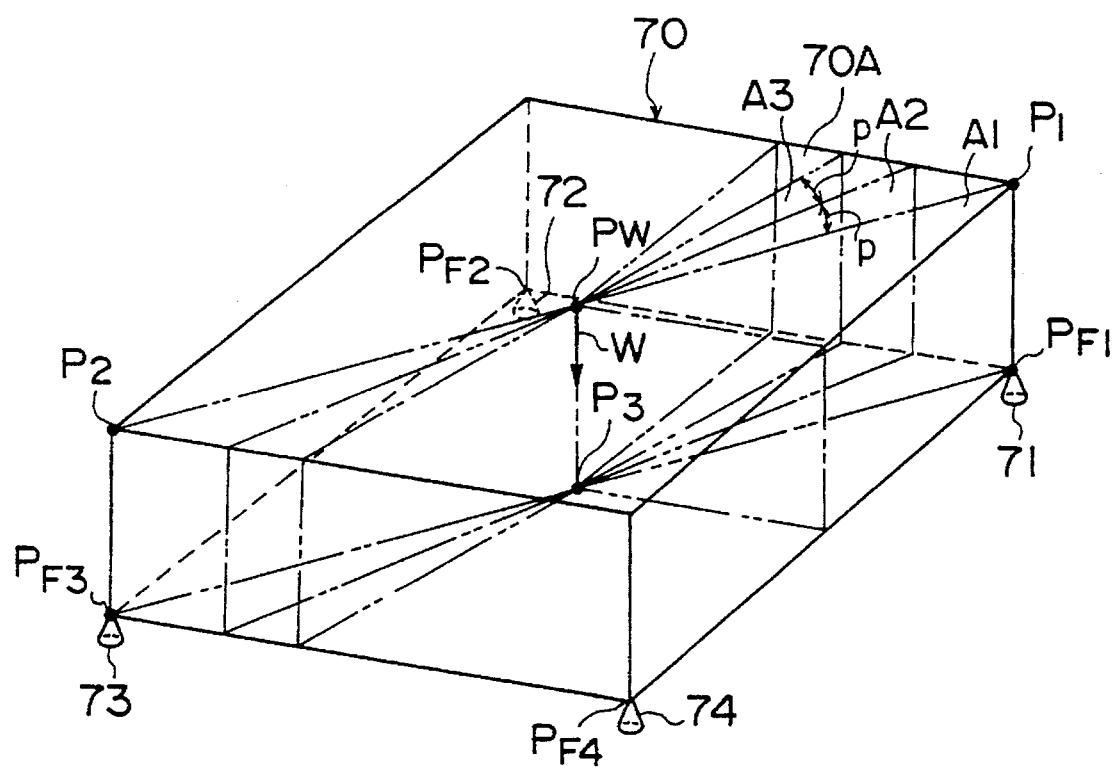
FIG. 12 is a perspective view for explaining optimum shape design conditions and a rib design plane.

This design is made under the conditions that, a rectangular parallelepiped design region 70 shown in FIG. 12 is arranged horizontally, 4 corner points $P_{F1}$ through $P_{F4}$ on the bottom surface of the design region 70 are respectively restrictively supported by supports 71 through 74, and a load W is applied on a load point $P_W$ at the center of the top surface of the design region 70 in a direction perpendicular to the paper in FIG. 12, that is, perpendicularly to the top surface of the design region 70. In this case, the conditions of the load and the restriction become symmetrical with respect to both the X-axis and the Y-axis, similarly to the case shown in FIG. 4. For this reason, it is sufficient to make the shape design with respect to 1 region 70A out of the 4 regions which are obtained by dividing the design region 70 into 4 regions.

Figure 13:
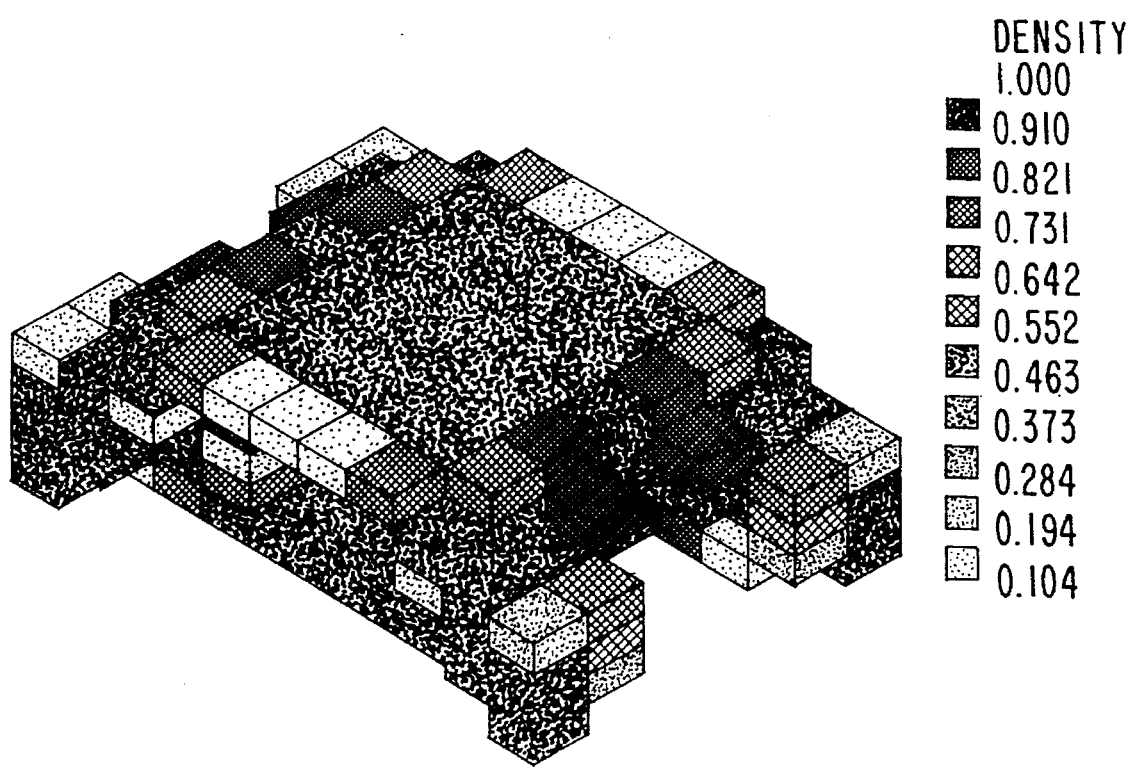
FIG. 13 is a perspective view showing the densities of finite elements as tones when an optimum shape is obtained by use of the homogenization method, with the finite element with density of 0.104 or less eliminated.

FIG. 13 is a diagram showing, as tone, the density distribution which is obtained by applying the optimum shape design technique using the homogenization method to the design region 70. In FIG. 13, each small square corresponds to a finite element, and the density is obtained in units of finite elements. The hatching and the like used to indicate the various densities are indicated on the right hand side of FIG. 13.

Conventionally, the optimum solid shape was obtained for example by eliminating the white finite element. However, when the optimum shape was to be designed in the plate structure, hints were merely provided to the designer as to the shape, and considerable time was required until a final plate structure is designed. Hence, this second embodiment uses the design apparatus shown in FIG. 6 to automatically design the optimum plate structure which is made up of a base and rib plates which reinforce the base. It is assumed that data related to the density distribution shown in FIG. 13 are stored in the floppy disk 33, and that the OS and the program for designing the optimum plate structure are stored in the HDD 35.

A procedure for designing the optimum plate structure will be described with reference to FIGS. 14A and 14B. The flow charts shown in FIGS. 14A and 14B will be described based on a first case and a second case. The second case supplements what is not included in the first case, and relates to the process after obtaining the rib design plane from the design region.

Figure 14A:
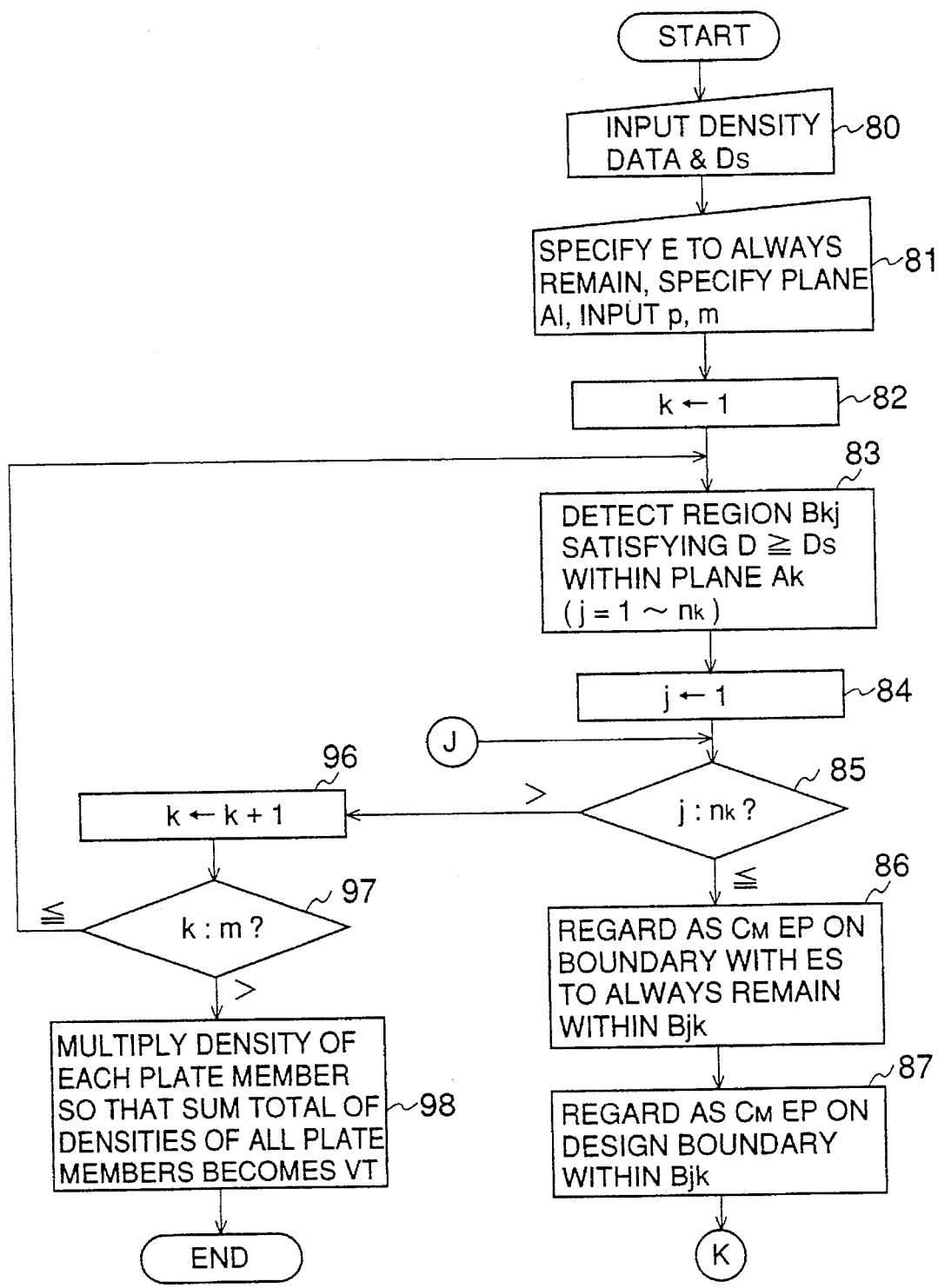
FIGS. 14A and 14B respectively are flow charts for explaining an optimum plate structure design procedure of a second embodiment of the method of designing optimum skeleton and plate structures according to the present invention.
Figure 14B:
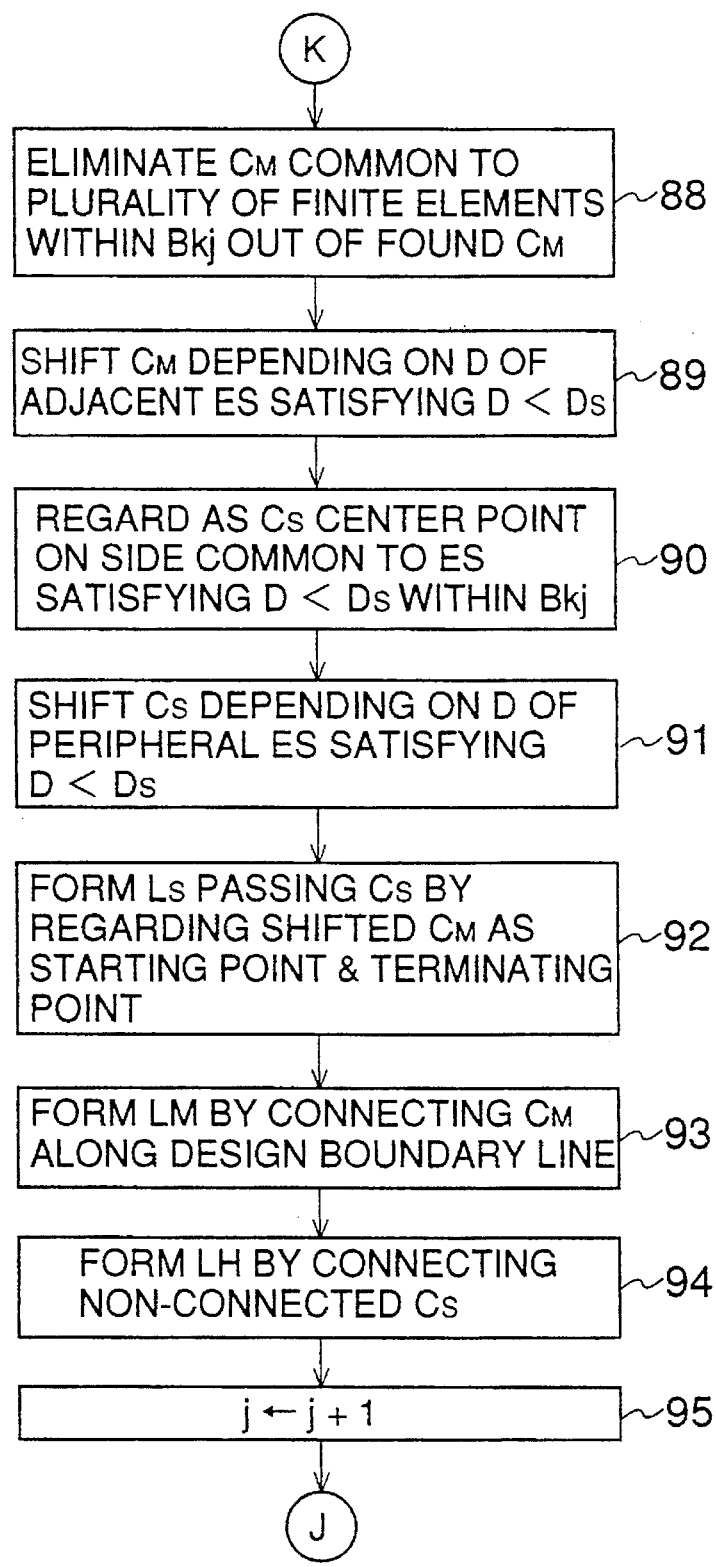

In FIGS. 14A and 14B, E denotes a finite element, ES denotes a cross section of the finite element E, EP denotes a vertex of the finite element cross section ES, D denotes a density of the finite element E, $C_M$ denotes a first kind of rib boundary point, $C_S$ denotes a second kind of rib boundary point, LM denotes a first kind of rib boundary line, LS denotes a second kind of rib boundary line, and LH denotes an extracted boundary line.

In FIG. 14A, a step 80 loads the density data stored in the floppy disk 33 into the RAM 23 via the FDD 34 and the FDD controller 24 shown in FIG. 6, based on the manipulation of the manual input unit 37. When the symmetrical nature described above is taken into consideration, it is sufficient that the density data are only related to the region 70A. However, in this embodiment, the density data related to the entire design region 70 are loaded by taking into consideration a non-symmetrical case. In addition, the reference value $D_S$ of the density is input by manipulating the manual input unit 37. $D_S=9$ in the first case, and $D_S=5$ in the second case.

A step 81 specifies the finite element E which is to always remain within the design region 70, by manipulating the manual input unit 37. The finite element E which is to always remain refers to the finite element E of a portion of an object base, for example, that is functionally necessary or, the finite element E having a density of 0.95 or greater, for example, and that is necessary from the strength point of view. In other words, the finite element E which is always to remain corresponds to a portion which becomes the base with respect to the rib plate.

The finite element E which is to always remain is not specified in the first case for the sake of simplifying the structure and description. However, the finite element E which is to always remain is specified in the second case.

In addition, a rib design plane A1 is specified by manipulating the manual input unit 37. For example, the design region 70 is displayed 3 dimensionally on the CRT display unit 36, and the rib design plane A1 is specified by specifying points $P_{F1}$, $P_1$, $P_2$ and $P_{F3}$ within the design region 70 using a mouse.

Figure 15A:
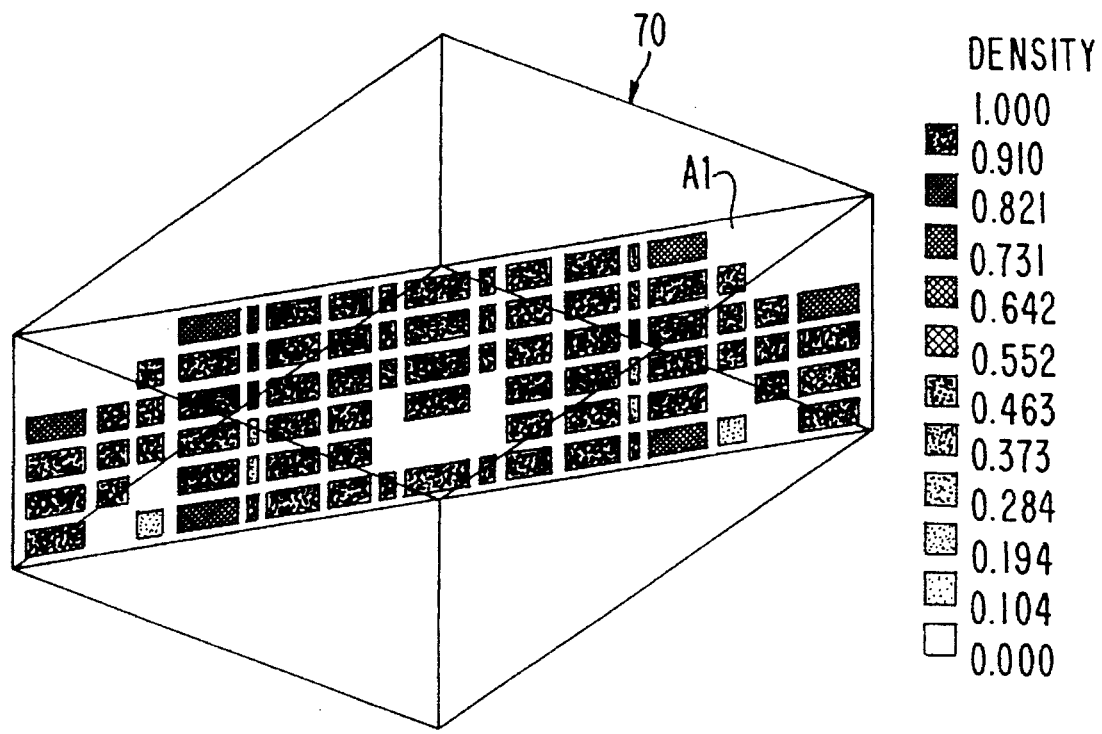
FIGS. 15A is a perspective view showing the densities at cross sections of the finite elements on a rib design plane A1 within the design region as tones, with the cross sections of the finite elements shown on a reduced scale.
Figure 15B:
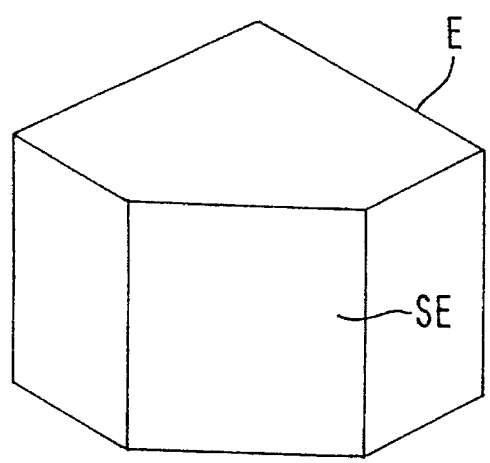
FIG. 15B is a perspective view on an enlarged scale showing a cross section of the finite element.

FIG. 15A is a diagram showing, as tone, the density within the rib design plane A1, with the cross section of the finite element shown on a reduced scale so as to clearly show the boundary of the finite element cross section. As may be seen from FIG. 15B, the cross section SE of the finite element E differs depending on its position.

Figure 16:
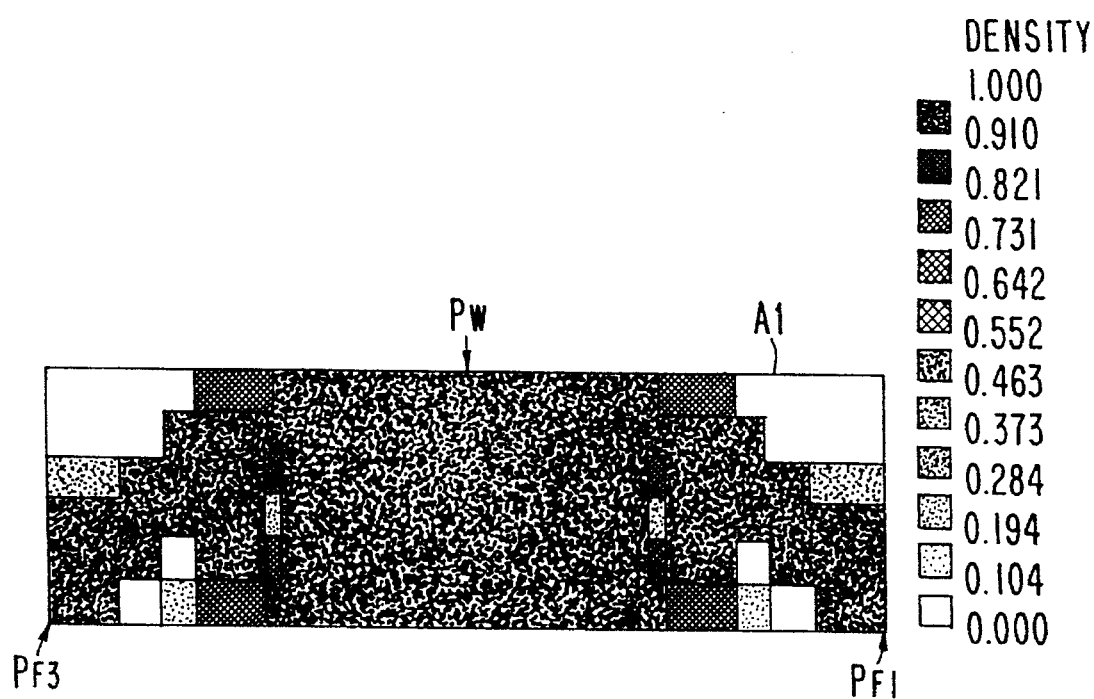
FIG. 16 is a diagram showing the densities at cross sections of the finite elements on the rib design plane A1 as tones.

FIG. 16 is a diagram showing, as tone, the density of the rib design plane A1 which is obtained from the design region 70. In the rib design plane A1 shown in FIGS. 17A through 17H, 18A through 18J and 19, the density of each finite element is multiplied by 10 and figures after the decimal point are rounded so as to illustrate the density by an integer, in order to simplify the description. In addition, the illustration of a density "0" is omitted in FIGS. 17A through 7H, 18A through 18J and 19.

In addition, a pitch p and a repetition number m are input by manipulating the manual input unit 37. The pitch p indicates the interval or angle of the rib design plane, and in the case shown in FIG. 12, the pitch p indicates an angle having a straight line connecting the load point $P_W$ and the point $P_3$ as its center. The repetition number m indicates automatic generation of the m rib design planes A1, A2, . . . , Am. Of course, the rib design planes A2, . . . , Am may be specified one at a time using the mouse, without specifying the pitch p and the repetition number m, similarly to specifying the rib design plane A1.

A step 82 shown in FIG. 14A substitutes 1 into k.

Figures 17A, 17B:
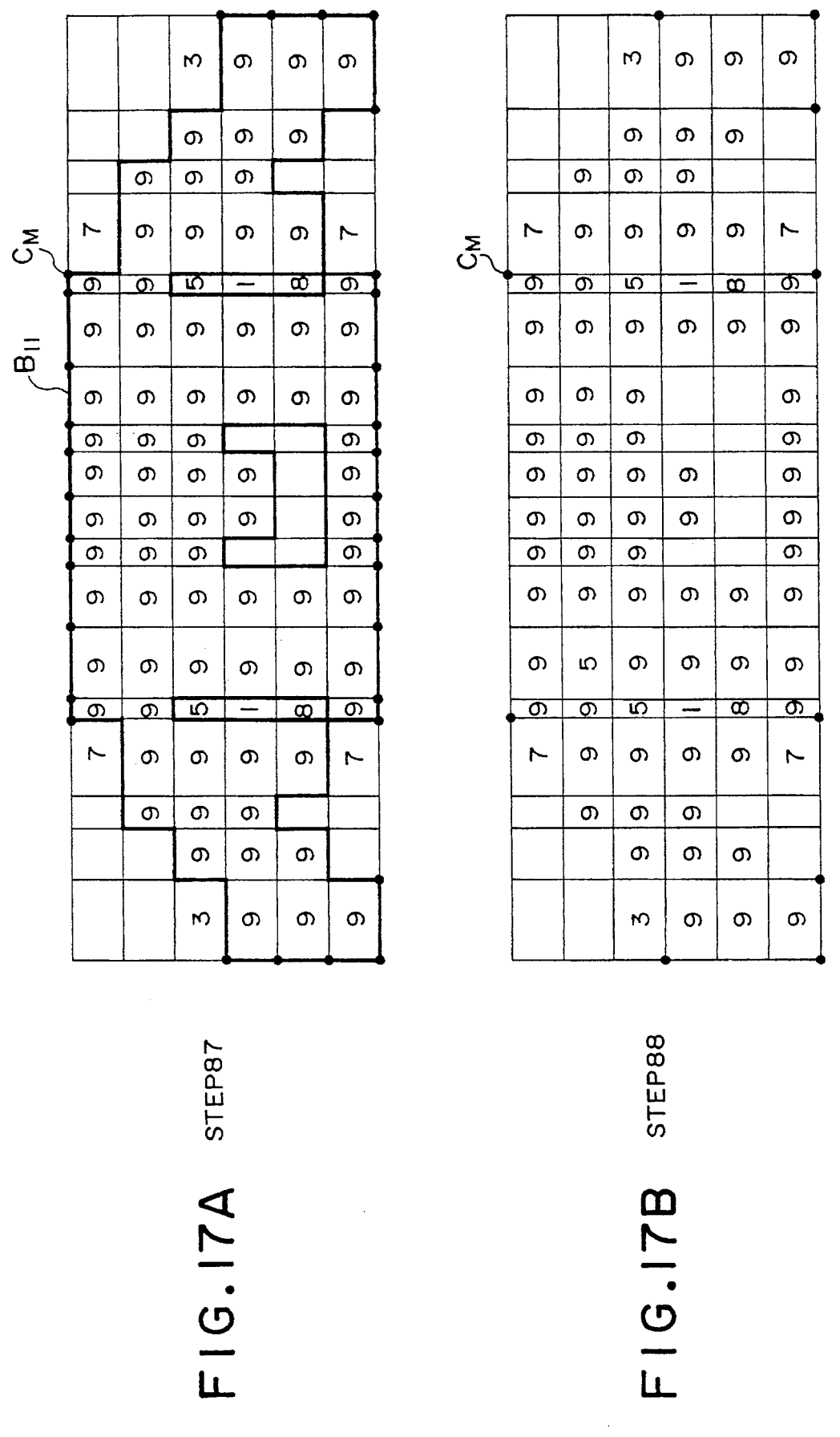

A step 83 generates a plane Ak when k≧2 and the repetition number m and the pitch p are specified. In addition, a rib schematic region $B_{kj}$ such that $D≧D_S$ is detected within the plane Ak, where j=1, . . . , $n_k$. The region $B_{kj}$ is the rib shape without correction. In FIG. 17A, $n_1=1$. In FIG. 18A through 18D, $n_1=2$.

In FIGS. 18A through 18D, the finite element with the hatching is the finite element which is specified in the step 81 and is to always remain, and is regarded as being non-eligible as the region $B_{kj}$.

A step 84 substitutes 1 into j.

A step 85 decides whether j>$n_k$ or j≦$n_k$. The process advances to a step 86 if j≦$n_k$, and the process advances to a step 96 if j>$n_k$.

The step 86 regards as the first kind of rib boundary point $C_M$ the vertex EP of the finite element cross section ES at the boundary with the cross section ES of the finite element E which is to always remain, within the region $B_{kj}$. In the first case, such a point $C_M$ does not exist. On the other hand, in the second case, the 3 black points at the upper side of FIG. 18E each correspond to such a point $C_M$.

A step 87 further regards as the first kind of rib boundary point $C_M$ the vertex EP of the finite element cross section ES on the design boundary, within the region $B_{kj}$. All of the black points in FIG. 17A and the 3 black points at the lower side of FIG. 18E each correspond to such a point $C_M$.

Then, a step 88 shown in FIG. 14B eliminates surplus first kind of rib boundary points $C_M$ out of the first kind of rib boundary points $C_M$ which are found in the steps 86 and 87 shown in FIG. 14A. In other words, the step 88 eliminates the first kind of rib boundary point $C_M$ which is common to a plurality of finite elements within the region $B_{kj}$. As a result, the first kind of rib boundary points $C_M$ which remain after this elimination are the black points shown in FIGS. 17B and 18F.

A step 89 shifts the first kind of rib boundary point $C_M$ to the side of the cross section ES of the adjacent finite element along the boundary line, depending on the density D of the adjacent finite element cross section ED satisfying $D<D_S$ on the rib design plane Ak. In FIGS. 17C and 18G, the arrow indicates the direction of the shift. This shift is the positional correction with respect to the rib boundary point $C_M$. The shift quantity from the point $C_M$ is set to (D2/D1)·d2, for example, where D1 and D2 respectively denote the densities of finite elements E1 and E2 sharing the point $C_M$ and satisfying D1>D2, and d2 denotes the length (length of the side) of the cross section of the finite element E2 in the shift vector direction. For example, the shift quantity from the point $C_M$ located at a joint E1b in FIG. 17C is (7/8)·d2, where d2 in this case denotes the length of the cross section of the finite element D1 in the direction of the arrow.

By this shift, the plate structure is further optimized, and it becomes possible to further increase the rigidity of the plate structure.

A step 90 regards as the second kind of rib boundary point $C_S$ the center point of the side which is common with the finite element cross section ES satisfying $D<D_S$, within the region $B_{kj}$. In FIGS. 17D and 18H, a small black point corresponds to such a point $C_S$.

A step 91 shifts the second kind of rib boundary point $C_S$ from the point $C_S$ in a direction towards a middle point of the cross section ES of a peripheral finite element. In FIGS. 17E and 18I, an arrow indicates the direction of the shift. This shift is the positional correction with respect to the rib boundary point $C_S$. The shift quantity from the point $C_S$ is set to (D2/D1)·d2, for example, where D1 and D2 respectively denote the densities of the finite elements E1 and E2 sharing the point $C_S$ and satisfying D1>D2, and d2 denotes the length (length of the side) of the cross section of the finite element E2 in the shift vector direction.

By this shift, the plate structure is further optimized, and it becomes possible to further increase the rigidity of the plate structure.

A step 92 regards the shifted first kind of rib boundary point $C_M$ as the starting point, and successively connects the mutually closest second kind of rib boundary points $C_S$ within the same finite element cross section ES or within the adjacent finite element cross sections ES so as to form the second kind of rib boundary line LS which has the other first kind of boundary point $C_M$ as the terminating point. The connection is made using the Bezier curve, for example. FIG. 17F shows the second kind of rib boundary lines LS1 through LS4, and FIG. 18J shows the second kind of rib boundary lines LS1 and LS2.

Figure 19:
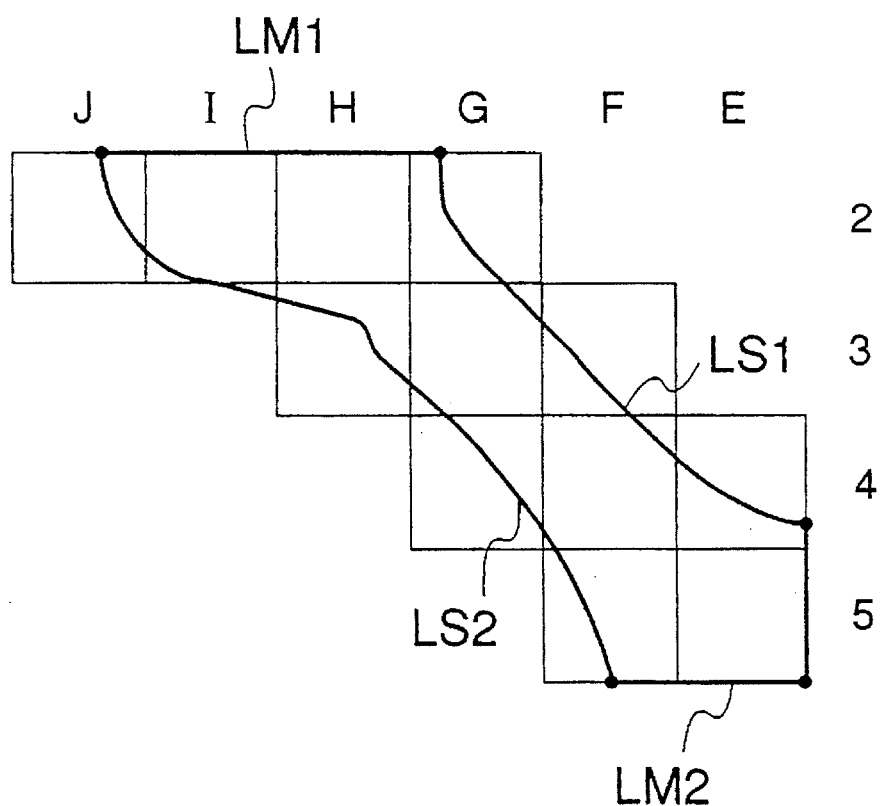
FIG. 19 is a diagram for explaining the process shown in FIG. 14B.

A step 93 forms the first kind of rib boundary line LM by successively connecting the end points $C_M$ of the different second kind of rib boundary lines LS in the mutually closest order along the design boundary line. As a result, the second kind of rib boundary line LS and the first kind of rib boundary line LM are connected to form a closed curve, and the outer shape (or outer form) of the rib plate is determined. FIG. 17G shows the first kind of rib boundary lines LM1 through LM4, and FIG. 19 shows the first kind of rib boundary lines LM1 and LM2.

A step 94 connects the mutually closest second kind of rib boundary points $C_S$ within the same finite element cross section ES or the adjacent finite element cross sections ES if non-connected second kind of rib boundary points $C_S$ exist, so as to form the extracted boundary line LH. In the first case, the extracted boundary lines LH1 through LH3 are formed as shown in FIG. 17H. In the second case, no remaining second kind of rib boundary point $C_S$ exists.

A step 95 increments j by 1, and the process returns to the step 85 shown in FIG. 14A.

If $j>n_k$ in the step 85, a step 96 increments k by 1.

A step 97 decides whether $k \leq m$ or $k>m$. The process returns to the step 83 if $k \leq m$, but the process advances to a step 98 if $k>m$.

The step 98 multiples the density on each plate member by a constant, so that the sum total of the densities of all of the plate members becomes the total volume VT, and the process ends.

A graphic display of the plate structure which is made up of the base and the rib plates which are obtained in the above described manner is made on the CRT display unit 36 shown in FIG. 8.

According to this second embodiment, it is possible to easily obtain the plate structure from the density distribution which is obtained by the optimum shape design. Hence, it is possible to reduce the time required for the final shape design.

Further, the present invention is not limited to these embodiments, but various variations and modifications may be made without departing from the scope of the present invention.

What is claimed is:

1. A method of designing an optimum skeleton structure by using a computer to obtain a skeleton structure from a density distribution within a 2 or 3 dimensional design region which is obtained as an optimum shape of a mechanical structure, said design region being divided into finite elements each having a density D assigned thereto, said method comprising the steps of:

(a) inputting a first reference value $D_S$ of the density D;
    (b) regarding points within the design region where an external force is applied as starting point candidates;
    (c) selecting a starting point from the starting point candidates;
    (d) extending a line from the starting point and successively passing through finite elements which are adjacent to each other and satisfying $D \geq D_S$ so that the line is as straight as possible; and
    (e) stopping the extension of the line and regarding the line as a skeleton member of the skeleton structure derived from the density distribution of the optimum shape of the mechanical structure, when no further adjacent finite elements satisfying $D \geq D_S$ exist or when one of the starting point candidates not previously selected is reached,
    said steps d through (e) being repeated with a starting point selected from one of the starting point candidates not previously selected until no more starting point candidates exist.

2. The method of designing the optimum skeleton structure as claimed in claim 1, wherein said step (d) selects a middle point of adjacent finite elements as a skeleton forming point, and forms the line by connecting a present selected skeleton forming point and a previously selected skeleton forming point.

3. The method of designing the optimum skeleton structure as claimed in claim 1, wherein said step (d) selects the successive adjacent finite elements which form a minimum angle to the extension of the line.

4. The method of designing the optimum skeleton structure as claimed in claim 1, wherein said step (a) also inputs a second reference value $D_H$ of the density, and said step (b) also regards as the starting point candidate a point within the finite element satisfying $D \geq D_H$.

5. The method of designing the optimum skeleton structure as claimed in claim 2, which further comprises the step of:

(f) shifting a position of the skeleton forming point depending on the density of a finite element which is in a vicinity of the skeleton forming point, located on both sides of a line of the skeleton member to which the skeleton forming point belongs and through which no other skeleton member passes.

6. A method of designing an optimum plate structure by using a computer to obtain a plate structure from a density distribution within a 3 dimensional design region which is obtained as an optimum shape of a mechanical structure, said design region being divided into finite elements each having a density D assigned thereto, said method comprising the steps of:

(a) inputting a reference value $D_S$ of the density D and specifying a rib design plane within the design region;

(b) obtaining a rib schematic region satisfying $D \geq D_S$ within the rib design plane;

(c) regarding a vertex of a cross section of a first finite element on a boundary of the rib design plane within the rib schematic region as a rib boundary point;

(d) regarding a point on a side of the first finite element common with a cross section of a second finite element adjacent to the first finite element and satisfying $D<D_S$ within the rib schematic region as another rib boundary point; and (e) forming a closed rib boundary line by connecting the rib boundary points within a cross section of the same finite element or within cross sections of adjacent finite elements, said rib boundary line defining the plate structure derived from the density distribution of the optimum shape of the mechanical structure.

7. The method of designing the optimum plate structure as claimed in claim 6 wherein:

said step (a) specifies a finite element which is to remain and are necessary functionally or from a strength point of view within the design region;

said step (b) eliminates a cross section of the specified finite element to remain from the rib schematic region; and said step (c) also regards as the rib boundary point a point on a boundary with the cross section of the specified finite element to remain within the rib schematic region.

8. The method of designing the optimum plate structure as claimed in claim 6 which further comprises the step of:

(f) shifting a position of the rib boundary point obtained in said steps (c) and (d) depending on the density D of a cross section of an adjacent finite element satisfying $D<D_S$ on the rib design plane.

9. The method of designing the optimum plate structure as claimed in claim 8, wherein:

said step (c) regards the rib boundary obtained in said step (c) as a first kind of rib boundary point and eliminates a first kind of rib boundary point which is common to the cross sections of a plurality of finite elements within the rib schematic region;

said step (d) regards the rib boundary point obtained in said step (d) as a second kind of rib boundary point; and said step (e) comprises the steps of:

(e1) forming a second kind of rib boundary line by regarding the first kind of rib boundary point as a starting point, successively connecting from the starting point mutually closest second kind of rib boundary points within the cross section of the same finite element or within the cross sections of the adjacent finite elements, and regarding as a terminating point another first rib boundary point within the cross section of the finite element to which the second rib boundary point belongs or within the cross section of the adjacent finite element which is adjacent thereto;

(e2) forming a first kind of rib boundary line by connecting end points of different second rib boundary lines along a design boundary line on the rib schematic region; and (e3) forming an extracted boundary line by connecting mutually closest second kind of rib boundary points which are not yet connected within the cross section of the same finite element or within the cross sections of the adjacent finite elements when the second kind of rib boundary points which are not yet connected exist.

* * * * *

UNITED STATES PATENT AND TRADEMARK OFFICE
CERTIFICATE OF CORRECTION

PATENT NO. : 5,574,658
DATED : November 12, 1996
INVENTOR(S) : Nobutaka ITO

It is certified that error appears in the above-indentified patent and that said Letters Patent is hereby corrected as shown below:

Column 12, line 20, change "0.8" to --0.6--.

Signed and Sealed this

First Day of April, 1997

Attest:

BRUCE LEHMAN

Attesting Officer

Commissioner of Patents and Trademarks